United States Patent
Mitash et al.

(10) Patent No.: US 12,387,315 B1
(45) Date of Patent: Aug. 12, 2025

(54) IDENTIFYING DEFECT(S) WITHIN ITEM(S) BEING MANIPULATED BY A ROBOTIC ARM

(71) Applicant: Amazon Technologies, Inc., Seattle, WA (US)

(72) Inventors: Chaitanya Mitash, Andover, MA (US); Manikantan Nambi, Malden, MA (US); Shiyang Lu, Edison, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 437 days.

(21) Appl. No.: 17/855,195

(22) Filed: Jun. 30, 2022

(51) Int. Cl.
*G06T 7/00* (2017.01)
*B25J 9/16* (2006.01)
*B25J 13/08* (2006.01)
*G06T 1/00* (2006.01)

(52) U.S. Cl.
CPC .......... *G06T 7/001* (2013.01); *B25J 9/1697* (2013.01); *B25J 13/08* (2013.01); *G06T 1/0014* (2013.01); *G06T 2207/20076* (2013.01); *G06T 2207/20081* (2013.01); *G06T 2207/30108* (2013.01)

(58) Field of Classification Search
None
See application file for complete search history.

(56) References Cited

U.S. PATENT DOCUMENTS

| | | | | |
|---|---|---|---|---|
| 7,725,475 B1 * | 5/2010 | Alspector | ................. | G06N 5/02 707/758 |
| 10,360,531 B1 * | 7/2019 | Stallman | .............. | G06Q 10/087 |
| 11,685,605 B2 * | 6/2023 | Makhal | ................. | G01B 11/26 700/230 |
| 11,969,760 B1 * | 4/2024 | De La Rosa | ............ | G07C 3/14 |
| 12,064,886 B1 * | 8/2024 | Terhuja | .................. | B25J 9/1684 |
| 2010/0092032 A1 * | 4/2010 | Boca | ...................... | B25J 9/1697 348/222.1 |
| 2013/0177232 A1 * | 7/2013 | Hirano | .................. | G06T 7/0004 382/141 |
| 2018/0060618 A1 * | 3/2018 | Ferrer Alós | ............ | G07G 1/009 |
| 2019/0070734 A1 * | 3/2019 | Wertenberger | ...... | B25J 15/0616 |
| 2019/0071261 A1 * | 3/2019 | Wertenberger | ........ | B25J 9/1697 |
| 2019/0236772 A1 * | 8/2019 | Cho | ...................... | G06T 7/0004 |

(Continued)

OTHER PUBLICATIONS

Implementing Deep Learning in Logistics Processes for Damaged Goods Detection. Trendov et al. (Year: 2022).*

(Continued)

*Primary Examiner* — Delomia L Gilliard
(74) *Attorney, Agent, or Firm* — Eversheds Sutherland (US) LLP

(57) ABSTRACT

First image data is received via a first imaging device that represents an item being manipulated by a robotic arm, and second image data is received via a second imaging device that represents item being manipulated by the robotic arm. Using a machine-learning model to analyze the first image data, a first score is determined that represents whether the item includes a defect. Additionally, using the machine-learning model to analyze the second image data, a second score is determined that represents whether the item includes the defect. Whether the item includes the defect is based on at least one of the first score or the second score, and in such instances, the robotic arm to perform an action.

20 Claims, 10 Drawing Sheets

(56) References Cited

U.S. PATENT DOCUMENTS

| | | | |
|---|---|---|---|
| 2020/0016745 A1* | 1/2020 | Tang | B25J 11/0005 |
| 2020/0086493 A1* | 3/2020 | Caron L'Ecuyer | B25J 9/1697 |
| 2020/0124484 A1* | 4/2020 | Fuller | G06Q 50/04 |
| 2020/0339350 A1* | 10/2020 | Dooley | B66F 7/0625 |
| 2021/0069904 A1* | 3/2021 | Duan | B25J 9/1653 |
| 2022/0129497 A1* | 4/2022 | Jin | G06F 18/2413 |
| 2022/0270229 A1* | 8/2022 | Nokelby | G06V 20/60 |
| 2022/0289501 A1* | 9/2022 | Sun | B25J 9/1664 |
| 2022/0289502 A1* | 9/2022 | Sun | B25J 13/088 |
| 2022/0315358 A1* | 10/2022 | Ryan | B07C 1/04 |
| 2022/0318667 A1* | 10/2022 | Babu Balasubramani | G06N 3/08 |
| 2022/0366558 A1* | 11/2022 | Bufi | G06V 10/764 |
| 2023/0026234 A1* | 1/2023 | Ma | G06V 10/26 |

OTHER PUBLICATIONS

Learning Hand-Eye Coordination for Robotic Grasping with Deep Learning and Large-Scale Data Collection. Levine et al. (Year: 2016).*

* cited by examiner

IDENTIFYING DEFECT(S) WITHIN ITEM(S) BEING MANIPULATED BY A ROBOTIC ARM

BACKGROUND

Many modern day industries rely on robotic manipulators, such as robotic arms, to sort, organize, and handle items. These robotic arms may function to increase a repeatability of tasks, increase an efficiency of production lines, and bring about other benefits. Unfortunately, in some cases, the items become damaged while being sorted, organized, and/or handled by the robotic arms. In such instances, continuing to process these items represents an inefficient use of resources and a loss of productivity. Accurately and timely identifying these instances remains a challenge.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
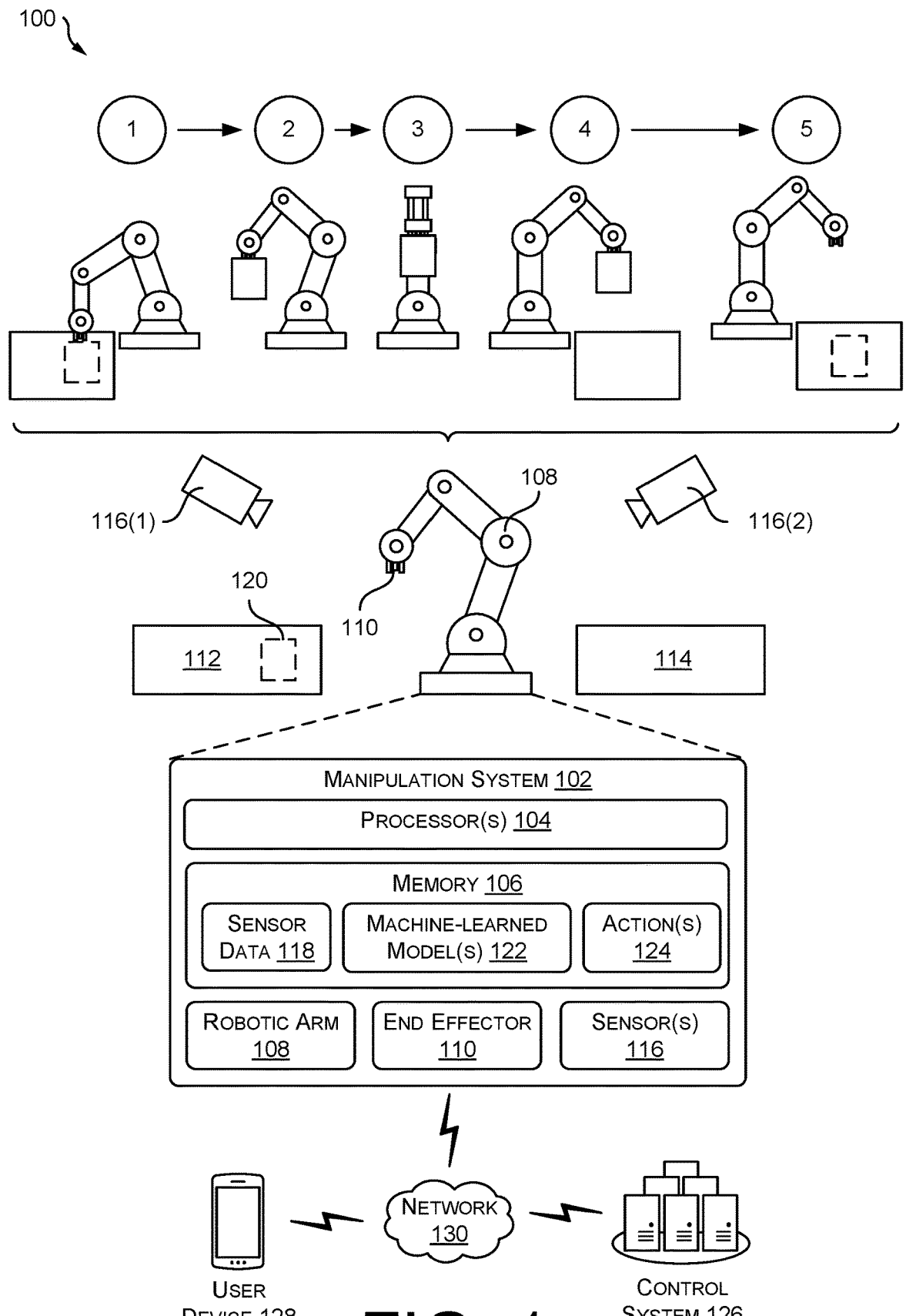
FIG. 1 illustrates an example environment including a manipulation system for manipulating item(s) within the environment and/or determining a presence of defect(s) associated with manipulating the item(s), according to an example of the present disclosure.

This application is directed, at least in part, to a manipulation system that is configured to determine a presence of one or more defects associated with processing item(s). In some examples, the manipulation system may include a robotic arm having an end effector that is configured to manipulate (e.g., move, handle, process, etc.) the item(s). For example, within an environment, the robotic arm may move the end effector to transfer item(s) between locations, such as between containers, conveyors, and so forth. During manipulation of the item(s), however, the item(s) may experience (or have) one or more defects. As non-limiting examples, the item(s) may tear, open, deconstruct, become crushed, dropped, and so forth. One or more sensor(s) of the manipulation system are arranged to detect these defects, and in response, one or more action(s) may be performed. For example, the item(s) may be set aside for further processing, may be returned to an original picked location (e.g., from a bin), or personnel may be instructed to manually sort the item(s). Accordingly, the techniques disclosed herein enable the identification of defect(s) associated with processing the item(s) in a time-efficient manner, which may lead to an increased throughput and/or a reduction in item(s) that are shipped with defects.

In some examples, the environment may represent any suitable environment (e.g., building, warehouse, facility, etc.) in which the item(s) (e.g., clothes, household accessory, toys, goods, etc.) are processed for shipment, sortation, storage, consolidation, and so forth. The item(s) may, in some examples, be packaged or otherwise disposed within packaging, such as boxes, envelopes, cartons, plastic, bags, and the like. In some examples, the item itself may include multiple contents (e.g., bag of parts, components, etc.) that are packaged together within packaging of the item.

The environment may include one or more of the manipulation systems for manipulating the item(s) from one location to another. In some examples, the manipulation system may be used for packaging items with the environment, sorting items within the environment, restocking items within the environment, consolidating items within the environment, and so forth. For example, the manipulation system may be used to move item(s) within a container (e.g., bin, tote, etc.) to a conveyor system for further processing. Here, the manipulation system may unload the item(s) from the container and place the item(s) on the conveyor system. More specifically, the robotic arm of the manipulation system may move the end effector to grasp (e.g., pick) an item within the container. Thereafter, while being grasped, the robotic arm may maneuver the end effector to the conveyor system and the end effector may subsequently release (e.g., place) the item onto the conveyor system. This sequence may repeat until the item(s) within the container have been unloaded, at which point, another container may be unloaded.

During manipulation, one or more defects may occur that impact a quality of shipping or processing the item(s). For example, a packaging of the item may open (e.g., rip, rupture, split, etc.) such that contents within the packaging are exposed or emptied, the packaging may tear, more than one item may be manipulated simultaneously, the item may fail to be picked, the wrong item may be manipulated, the item may be dropped during manipulation, and so forth. Continuing to further process these item(s), and/or failing to accurately detect these defects, results in efficiencies and reduced throughout. Here, sensor(s) of the manipulation system may be disposed about the environment to detect the defect(s), or whether the item(s) were successfully manipulated between locations without defect(s).

The sensor(s) may include any suitable sensors for observing manipulation of the items. For example, the sensor(s) may include red, green, blue, depth (RGBD) camera(s) and/or three-dimensional (3D) sensors. In some examples, the sensor(s) may be arranged overhead, alongside, or otherwise in proximity to the robotic arm so as to capture manipulation of the item(s), from picking to placement. As such, the sensor(s) may be used to determine whether the item(s) have experienced any defects during manipulation. In some examples, the sensor(s) may include multiple sensors that are arranged to detect the manipulation at or from different viewpoints (e.g., orientations) to account for any occlusions that may occur. For example, while being processed, portions of the robotic arm may obstruct the sensor(s) view of the item(s). As an additional example, the defects may be detectable from a first viewpoint, but undetectable from a second viewpoint. Having multiple sensor(s), with different viewpoints, may increase an accuracy of detecting the defect(s) during manipulation. Any number of sensor(s), such as two, three, four, etc. may be used, and the sensor(s) may include different types of sensor(s) compared to one another.

Sensor data generated by the sensor(s) may be analyzed to determine the presence of the defect(s). In instances in which the sensor(s) include camera(s), the sensor data may include image data and/or video data. In some examples, the sensor data may be input into machine-learned model(s) that are trained and configured to detect the defect(s). For example, the machine-learned model(s) may have been previously trained to determine, from the sensor data, whether contents of the item(s) were exposed or fell out of the packaging, whether multiple item(s) were picked, whether packaging of the item became torn, whether an incorrect item was picked, and so forth. In other words, the machine-learned model(s) are trained to determine the presence of defect(s). The machine-learned model(s) may be trained from a database (e.g., historical data, such as image data, of past items that were manipulated that included defects and/or were defect free) to analyze sensor data captured by the sensors.

In some examples, the sensor data is continuously generated by the sensor(s) throughout manipulation of the item and provided as an input into the machine-learned model(s). In this sense, the machine-learned model(s) continuously process the sensor data to determine the presence of defect(s) during manipulation of the item. Such continuous determination attempts to determine the defect(s) and resolve the defect(s) in a time-efficient manner. Moreover, previously captured sensor data, in addition to subsequently sensor data, may be input into the machine-learned model(s) to determine differences therebetween and as a way to determine the presence of defects. Of course, when no defect(s) are detected, the robotic arm may continue to manipulate items without interruption.

As indicated above, more than one sensor may be arranged around the robotic arm, and in such instances, sensor data from the respective sensors may be processed to determine the presence of defect(s). For example, first sensor data from a first sensor and second sensor data from a second sensor may be input into the machine-learned model(s). Such process may be performed in parallel or in series. In some examples, either or both of the first sensor data or the second sensor data may be used to determine the presence of the defect(s). For example, even though the machine-learned model(s) may not detect the defect from the first sensor data, possible defects may be occluded via the robotic arm (e.g., a structure thereof) and/or the defect may be located on another side of the item not visible to the first sensor. In such instances, however, the machine-learned model(s) may detect the defect(s) from the second sensor data, which has a different viewpoint of the item. In this example, if the machine-learned model(s) determine the presence of defect(s) in any sensor data, the item may have defect(s). In other examples, however, the defect(s) may have to be identified from sensor data across different sensor(s) as a way to confirm the presence of defect(s).

In some examples, the machine-learned model(s) may output a score (e.g., confidence, probability, likelihood, etc.) associated with the item containing defect(s). The score may be compared against a threshold, and if the score is greater than the threshold, a defect may be present. Alternatively, if the score is less than the threshold, a defect may not be present. Still, in some examples, the machine-learned model(s) may output a score, or indication, associated with the type of defect detected from the sensor data.

In some examples, the machine-learned model(s) may determine characteristic(s) of the item(s) for determining the presence of defect(s). In some instances, these characteristics may be compared against reference characteristics to determine whether the item contains defects. For example, the machine-learned model(s), upon identifying one or more of these characteristic(s), may assess the characteristic(s) in comparison with information stored in the database to determine whether the item includes defect(s). In some examples, the characteristic(s) may include a size, shape, dimensions, texture, material, weight, packaging, etc. of the item. The characteristic(s) of the item may be used to determine changes during manipulation. For example, if sensor data collected at a first instance in time, such as while the item is being picked from the container, indicates that the item (or a packaging thereof) includes a first size, first shape, etc., these first characteristics may be compared against second characteristics during manipulation. For example, while the robotic arm is moving the item to the conveyor system, second sensor data collected at a second instance in time may indicate a second size, second shape, etc. In some examples, if the first size and the second size are different, and/or the first shape and the second shape are different, this may be indicative of a defect. For example, a size of the item may become larger in response to the packaging opening. In such instances, the machine-learned model(s) may determine the presence of defect(s) by identifying patterns within the sensor data collected overtime and during manipulation of the item. That is, if the characteristics of the item deviate during manipulation, such deviation may be indicative of defect(s) of the item. In such instances, the machine-learned model(s) may process the sensor data collected at the first instance in time as well as the sensor data collected at the second instance in time to determine differences therebetween.

In response to determining the presence of defect(s), one or more corrective action(s) may be performed. For example, if during picking an item the packaging of the item becomes torn, the item may be released back into the container. This may avoid having contents of the item(s) scattered across the environment, or between multiple locations, or may avoid having torn packaging being shipped or otherwise transported. Instead, the contents may be consolidated within the container (or at a single location). Additionally, the container may be flagged for human manipulation (e.g., sortation). If the defect includes a failure to pick the item, the robotic arm may reattempt to pick the item (or another item) from the container. If multiple items were picked, the robotic arm may release the items back into the container and reattempt to pick a single item. If the wrong item was picked, the robotic arm may reattempt to pick the correct item. In some examples, the action(s) that are selected may be based at least in part on the type of detected defect. In some examples, indications of the action(s), or a presence of defect(s), may be output within the environment. For example, light indicator(s) may flash to indicate the presence of a defect, that personnel has been called to resolve the defect, and so forth.

In addition to, or alternative from, the sensor(s) including RGBD camera(s) and/or 3D cameras, the manipulation system may include other sensor(s), such as weight sensor(s), torque sensor(s), pressure sensor(s), etc. For example, a weight sensor may be coupled to the end effector and used to determine a weight carried by the end effector. If the weight fluctuates (e.g., more than a threshold) while the item is being manipulated, this may be indicative of content(s) of the item falling out of the packaging and/or that the item was dropped. In some examples, any combination of sensor(s), and sensor data generated by the sensor(s), may be used to determine the present of defects. In some examples, the machine-learned model(s) may be used to draw comparisons, or correlations, between sensors data generated by the sensor(s) for determining the presence of defect(s).

As noted above, the machine-learned model(s) may determine characteristic(s) of the item via analyzing the sensor data, and then use the characteristic(s) to determine the presence of defects. In other examples, sensor(s) may image (e.g., scan) a barcode or other identifier of the item. This identifier may be used to determine the characteristic(s) or additional characteristic(s) of the item, such as weight, dimensions (e.g., length, width, depth), packaging material, shape (e.g., rectangular, cylinder, etc.), and so forth. In some examples, these characteristic(s) may be compared against the characteristic(s) of the item as determined from the machine-learned model(s). For example, first characteristics as determined from the barcode of the item may be compared against second characteristics as determined from the machine-learned model(s). If the characteristic(s) are different by a threshold amount, such difference may be indicative of defect(s).

Additionally, or alternatively, in some examples, the characteristic(s) may be determined from sensor data collected by the sensor(s), independent of the imaging the identifier. In such examples, first sensor data may be input into a first machine-learned model trained to identify the characteristic(s), and second sensor data may be input into a second machine-learned model trained to determine the defects. As part of the second-machine-learned model(s) determining the defect(s), the second machine-learned model(s) may use the characteristic(s) as determined from the first machine-learned model(s). In such examples, if the characteristic(s) change during manipulation of the item, or if the characteristic(s) are different than expected, defects may be present.

In some examples, the end effector may represent a gripper (e.g., articulating members) that grasps the items. In other examples, the end effector may represent a vacuum end effector that suctions the items. Regardless of the specific implementation, it is to be understood the robotic arm and the end effector may include respective components that enable their function (e.g., actuators, vacuum ducts, etc.). Additionally, although the discussion is with regard to manipulating the item from the container to the conveyor system, the manipulation system may be used to manipulate the item between other locations (e.g., from one container to another, from one conveyor system to another, etc.).

In some examples, the manipulation system may itself determine the presence of the defects, or the manipulation system may communicatively couple to one or more computing devices that determine the presence of the defects and/or the corrective action(s). In such examples, the manipulation system may generate the sensor data and send the sensor data to the computing devices for analysis. The computing devices may therein utilize the machine-learned model(s) for determining the presence of defect(s). In some examples, the computing device(s) may reside within the environment or remote from the environment, and/or may be part of the manipulation system or separate from the manipulation system.

While the above discussion is with regard to a single manipulation system at a particular location within the environment, in some examples, the environment may include any number of manipulation systems that manipulate the items (or other goods, objects, etc.) between locations. In such examples, the computing devices or a central system may oversee the manipulation system(s) within the environment and communicatively couple thereto.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example environment 100. In some examples, the environment 100 may represent an environment in which item(s) are sorted or otherwise fulfilled, categorized, sorted, and/or processed. In some examples, the environment 100 may represent a distribution center, warehouse, cross-docking station, or other facility. Although not shown, the environment 100 may include inventory. Generally, the inventory stores an inventory of items (e.g., clothing, electronics, toys, household goods, etc.). In some examples, the items may be stored in bins, slots, shelves, containers, crates, stalls, racks, etc. within the environment 100. The inventory may be dispersed about the environment 100 and/or may be located in dedicated areas of the environment 100 (e.g., perimeter). Additionally, or alternatively, in some examples, the inventory may be located separate from the environment 100, such as in a cross-docking station, and the environment 100 may receive the items for further sortation.

The environment 100 is shown including a manipulation system 102 having processor(s) 104 and memory 106, where the processor(s) 104 may perform various functions and operations associated with determining defects of items being processed within the environment 100, and the memory 106 may store instructions executable by the processor(s) 104 to perform the operations described herein. The manipulation system 102 is also shown including a robotic arm 108 and an end effector 110. The end effector 110 is disposed on an end of the robotic arm 108 to move, grab, or otherwise manipulate item(s) within the environment 100. For example, the robotic arm 108 and the end effector 110 may be used to manipulate (e.g., move) item(s) from a first container 112 (e.g., tote, bin, etc.) to a second container 114 (e.g., tote, bin, etc.). However, although discussed herein as manipulating item(s) between containers, the robotic arm 108 and the end effector 110 may be used to manipulate item(s) between containers and conveyor systems, or other equipment used for sortation, consolidation, shipment, packaging, and so forth.

The environment 100 is further shown including one or more sensor(s) 116, such as a first sensor 116(1) and a second sensor 116(2), for detecting defects associated with manipulating the item(s). In some examples, the sensor(s) 116 are components of the manipulation system 102, or may be components (e.g., devices) that are separate from the manipulation system 102. Although two sensors are shown, any number of sensors (e.g., three, four, etc.) may be used to detect the defect(s). In some examples, the sensor(s) 116 are arranged around (e.g., vertically above, horizontally besides, etc.) the robotic arm 108 so as to view the items being manipulated by the robotic arm 108 and the end effector 110. As such, the robotic arm 108 and the item being manipulated are within a field of view of the sensor(s) 116. Additionally, or alternatively, the sensor(s) 116 may be coupled directly to the robotic arm 108 such that the sensor(s) 116 move with move with the robotic arm 108.

In some examples, the first sensor 116(1) and the second sensor 116(2) include different viewpoints, fields of view (FoV), orientations, and so forth of the robotic arm 108, the end effector 110, or the items being manipulated. The different viewpoints of the sensor(s) 116 may increase an accuracy of the manipulation system 102 detecting the defects during manipulation, for example, given potential occlusions of the items. Additionally, the multiple viewpoints of the sensor(s) 116 may accurately identify the defects in instances where the defects are not visible from a first viewpoint of the first sensor 116(1), for example, but are visible from a second viewpoint of the second sensor 116(2). Example defect(s) include whether packaging of the item 120 is opened, whether packaging of the item 120 is deconstructed, whether the item 120 was dropped by the robotic arm 108 during manipulation, whether the robotic arm 108 failed to pick the item 120, whether the item 120 is crushed by the end effector 110, whether multiple item(s) were picked, whether the wrong item was picked, whether contents of the item were emptied during manipulation, and so forth. Additionally, the manipulation system 102 may be able to determine whether the manipulation was successful (e.g., no defect(s)).

In some examples, the sensor(s) 116 represent cameras that capture videos and/or images in the form of sensor data 118. The cameras, in some examples, may be three-dimensional (3D) sensors that are used to determine a size, shape, position, and so forth of an item in 3D space. For example, the sensor(s) 116 may image (e.g., scan) an item to determine coordinates that represents the size, shape, and/or position of the item in 3D space. These coordinates may reveal the boundaries of the item in the 3D space for determining the size, shape, and position of the item. Such sensor data 118 may be used to assist the robotic arm 108 in determining the location of an item within the first container 112, for example, such that the robotic arm 108 may grab the item. Additionally, or alternatively, the cameras may represent red, green, blue, depth (RGBD) sensors that produce color images of the item augmented with depth information. These images may be analyzed to determine a visual appearance of the item (e.g., colors, shapes, size, and/or textures).

However, the sensor(s) 116 may include other types of sensors used by the manipulation system 102 to detect the defects, or which are otherwise disposed throughout the environment 100. Any number of sensor(s) 116 may be positioned around the robotic arm 108, on the robotic arm 108, the end effector 110, and/or within the environment 100. For example, the sensor(s) 116 may be one or more cameras that emit electromagnetic waves at an item, such as a millimeter wave camera, a short wave infrared camera, or one or more multi-spectral cameras. In such instances, these sensors may be used to determine a material used to form the item or a package holding the item (e.g., paper, plastic, metal, etc.). As another example, the sensor(s) 116 may include a weight sensor (e.g., force sensor, pressure sensor, etc.) used to determine a weight of an item grabbed by the robotic arm 108 and/or the end effector 110. For example, after the robotic arm 108 has lifted an item out of the first container 112, a weight sensor may determine a weight of the item and/or a change in weight of the container previously holding the item. The difference between these two determined weights represents the weight of the item lifted by the robotic arm 108. Still, the sensor(s) 116 may include scanners that scan an identifier (e.g., barcode, UPC, QR, etc.) on the item. If an identifier is located and scanned, the scanned identifier may be used to identify the item and determine characteristics of the item (e.g., weight, dimensions, packaging, etc.). Other examples of identifying items, or characteristics of the item, are disclosed in, for example, U.S. patent application Ser. No. 17/212,381, filed Mar. 25, 2021, the entirety of which is herein incorporated by reference for all its purposes.

In FIG. 1, an example scenario is shown associated with the robotic arm 108 and the end effector 110 manipulating an item 120 from the first container 112 to the second container 114. For example, the robotic arm 108 may be instructed to move the item 120 from the first container 112 to the second container 114. At "1", the robotic arm 108 is shown reaching into the first container 112 to retrieve the item 120. For example, the end effector 110 may include a vacuum end effector that suctions the item 120. In some examples, the sensor(s) 116 (or different sensor(s) 116) may be used to determine the position of item 120 within the first container 112 in order to properly position the robotic arm 108 and the end effector 110 within the first container 112 to pick up the item 120.

At "2", the robotic arm 108 is shown lifting the item 120 out of the first container 112. In some examples, while the item 120 is positioned out of the first container 112, at "2" the first sensor 116(1) and the second sensor 116(2) may capture sensor data 118 of the item 120. The sensor data 118, noted above, may represent image data and/or video data. The sensor data 118 is input into machine-learned model(s) 122 for determining whether the item 120 includes one or more defect(s). For example, packaging of the item 120 may become torn, open, etc., contents of the item 120 may spill out of the packaging, the item 120 may be damaged (e.g., bent, crushed, deformed, etc.), the wrong item may be picked, and so forth. These defect(s) may occur while the item 120 is being manipulated, or prior to the item 120 being manipulated by the robotic arm 108 and/or the end effector 110. Still, in some examples, and although not shown in FIG. 1, more than one item may be picked up by the robotic arm 108, and/or the robotic arm 108 may fail to pick up the item 120.

In some examples, the machine-learned model(s) 122 are trained to identify characteristic(s) of the item 120 for determining the defect(s). For example, the machine-learned model(s) 122 may be trained from a database (e.g., historical data, such as image data and/or video data, of past items that were processed and which contained or did not contain defects) to analyze the sensor data 118 captured by the sensor(s) 116 for identifying characteristic(s) of the item 120, such as whether packaging of the item 120 is torn, whether the packaging is open, whether contents of the item 120 are falling from the packaging, whether the item 120 was dropped, whether multiple items were picked, whether no item was picked, and so forth. In some instances, these characteristics may be compared against reference characteristics to determine whether the item 120 contains defects.

The machine-learned model(s) 122 may be configured to process, in parallel, sensor data 118 captured by the sensor(s) 116 for determining the characteristic(s) and whether the sensor data 118 is indicative of defects. More specifically, in some examples, to determine the presence of the defect(s), either or both of the sensor data 118 generated by the first sensor 116(1) and the second sensor 116(2) may be used. That is, as the sensor data from the first sensor 116(1) and the second sensor 116(2) may capture different viewpoints of the item 120 and/or the manipulation of the item 120, the sensor data 118 depicts the item 120 at different viewpoints. As noted above, these differing viewpoints assist in accurately detecting the defect(s). In some examples, if one or both of the sensor data 118 of the first sensor 116(1) and the sensor data 118 of the second sensor 116(2) indicates the defect, the manipulation system 102 may perform the one or more action(s) to refrain from processing the item 120. Alternatively, if no defects are detected, the robotic arm 108 may continue to process the item 120.

In some examples, the machine-learned model(s) 122 may determine, based on the characteristic(s), a probability (or score) that the item 120 contains defect(s) or does not contain defects. In some examples, the score may be associated with the item 120 containing any defect(s), or may be associated with the item 120 containing a specific defect (e.g., ripped package, contents falling out, etc.) If the probability satisfies a certain confidence threshold that there are no defect(s), the item may be deemed to not have defects.

If defect(s) are present, the manipulation system 102 may determine one or more action(s) 124 to perform. In some examples, the action(s) 124 may include refraining from processing the item 120, such as placing the item 120 back into the first container 112, calling attention to personnel to manually sort the first container 112 (which may contain contents of the item 120 that fell out during manipulation (e.g., picking)), calling attention to personnel to manually repackage the item 120, sort the first container 112 for further processing, and so forth. These action(s) 124, when performed, serve to reduce inefficiencies in further processing the defected item. In some examples, the manipulation system 102 itself may output indications of the defect(s) being detected (e.g., audio, such as an alert, and/or visual, such as lights).

If no defect(s) are detected, at "3", the manipulation system 102 may continue to process the item 120. For example, at "3" the robotic arm 108 may swivel, rotate, or otherwise manipulate the item 120 in a direction towards the second container 114. As the robotic arm 108 swivels, sensor data 118 captured by the first sensor 116(1) and the second sensor 116(2) may continue to be provided as an input to the machine-learned model(s) 122. However, at this instance, the sensor data 118 generated at "3" may be provided as an input into the machine-learned model(s) 122 in addition to the sensor data generated at "2". That is, throughout manipulating the item 120, the manipulation system 102 may determine whether defects are present. By providing both sensor data 118, the machine-learned model(s) 122 may determine whether the item 120 has changed between "2" and "3." At this point, for example, the sensor data 118 collected at "3" may depict the item 120 differently as compared to the sensor data 118 collected at "2." If a defect is present, the robotic arm 108 may be instructed to return to the first container 112, place the defected item into a third container (not shown in FIG. 1), place the defected item into the second container 114, call for assistance, etc. If no defect is present, the manipulation system 102 may continue to manipulate the robotic arm 108 to the second container 114.

At "4" the robotic arm 108 may manipulate to the robotic arm 108 over the second container 114, such that the item 120 it positioned vertically above the second container 114. Herein again, the manipulation system 102 may determine whether defects are present. At this instance, the machine-learned model(s) 122 may receive, as an input, the sensor data 118 generated by the first sensor 116(1) at "2," "3", and "4" for determining whether any differences exist therebetween that are indicative of a defect. Likewise, the machine-learned model(s) 122 may receive, as an input, the sensor data 118 generated by the second sensor 116(2) at "2," "3", and "4" for determining whether any differences exist therebetween that are indicative of a defect. In some examples, if a defect is present, the robotic arm 108 may be instructed to return to the first container 112, place the defected item into a third container, place the defected item into the second container 114, call for assistance, etc. If no defect is present, the manipulation system 102 may place the item 120 into the second container 114. For example, at "5" the item 120 may be dropped, placed, or otherwise put into the second container 114. That is, if no defects were detected from "2" to "4" the item 120 may be processed and placed into the second container 114. After placing the item 120 into the second container 114, the robotic arm 108 may return to the first container 112 (or another container) to retrieve another item for processing. However, the machine-learned model(s) 122 may also receive sensor data 118 from the sensor(s) 116 even after the item 120 has been placed into the second container 114 for determining the presence of defects. For example, once placed into the second container 114, packing of the item 120 may become damaged, and in such cases, a defect may be determined.

In some examples, the manipulation system 102 communicatively couples to a control system 126 and/or a user device 128 via one or more network(s) 130. The network(s) 130 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The manipulation system 102, the control system 126, and the user device 128 include suitable components, interfaces, and the like for communicating over the network(s) 130.

The control system 126, in addition to or alternative from the manipulation system 102 determining the defect(s), may determine the presence of defect(s). In such examples, the control system 126 may receive the sensor data 118 from the sensor(s) 116 and determine the presence of defect(s) (e.g., via the machine-learned model(s) 122). In instances in which defect(s) are determined, the control system 126 may cause the manipulation system 102 to perform one or more of the action(s) 124 (e.g., via instructing the robotic arm 108 and/or the end effector 110). In other examples, the manipulation system 102 and the control system 126 may perform any level of split processing for determining the presence of defect(s) and causing the action(s) 124 to be performed. For example, the control system 126 may train the machine-learned model(s) 122, and then send the machine-learned model(s) 122 to the manipulation system 102.

The user device 128 may be associated with personnel within the environment 100, such as personnel that work within the environment. In response to defect(s) being detected, the manipulation system 102 and/or the control system 126 may transmit an indication of such to the user device 128. Such indication may be audio and/or visual and indicate the presence of the defect(s). In response, the personnel may be dispatched to resolve the defect(s) and perform one or more of the action(s) 124, such as repackaging the item 120.

Although FIG. 1 illustrates that sensor data 118 is collected at certain instances during manipulation of the item 120, the sensor data 118 may be collected at other instances (e.g., while the item 120 is within the first container 112). Additionally, or alternatively, the machine-learned model(s) 122 may receive the sensor data 118 at different or other times during manipulation. For example, although discussed herein as processing the sensor data 118 at three different instances to determine the defects (e.g., at "2," "3," and "4"), the sensor data 118 may be provided to the machine-learned model(s) 122 at any number of times during manipulation. For example, in between "2" and "3" additional sensor data 118 may be collected and input into the machine-learned model(s) 122 for determining whether defects exist. Further, sensor data 118 generated by more than two of the sensor(s) 116 may be provided to the machine-learned model(s) 122, and the machine-learned model(s) 122 may be configured to process the sensor data 118 in parallel to determine the presence of defects.

Figure 2:
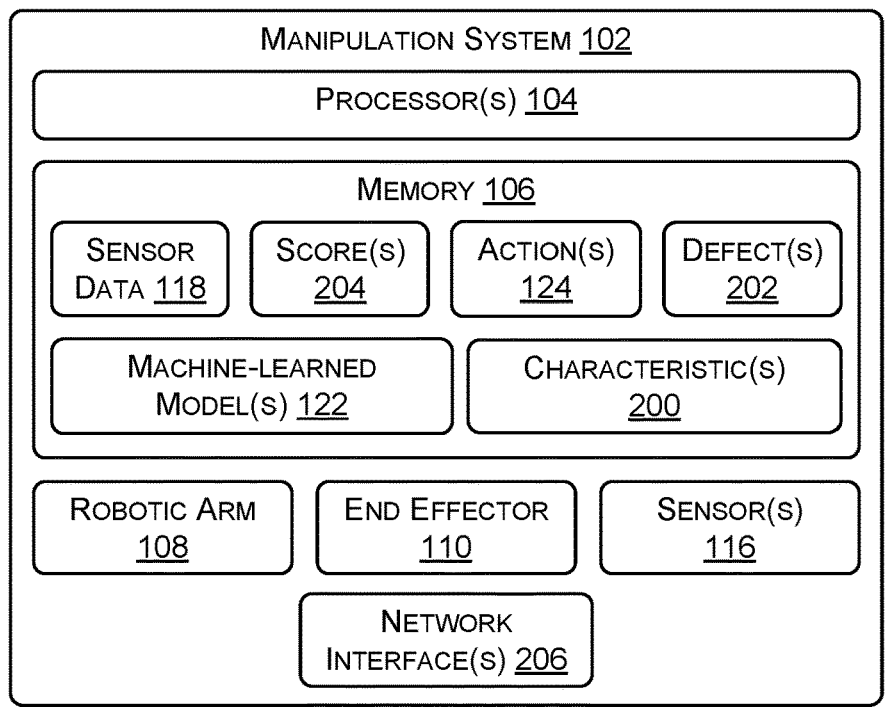
FIG. 2 illustrates select functional components of the manipulation system and a control system in communication with the manipulation system, according to an example of the present disclosure.
Figure 2:
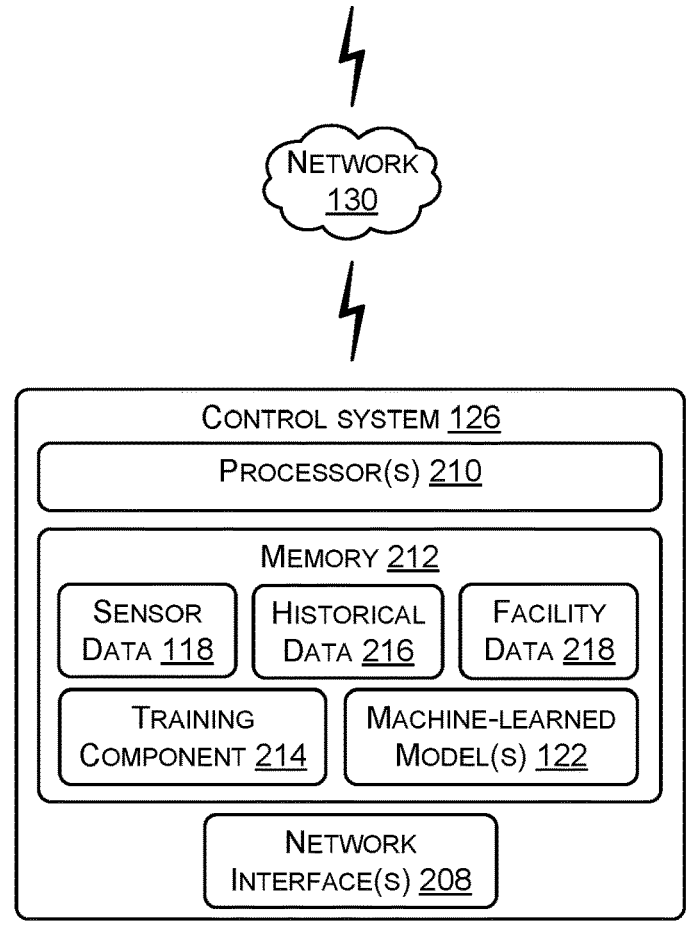

FIG. 2 illustrates select components of the manipulation system 102 and the control system 126. As introduced above, the manipulation system 102 includes the processor(s) 104 and the memory 106, where the processor(s) 104 may perform various functions and operations associated with determining defect(s) of items being processed within the environment 100, and the memory 106 may store instructions executable by the processor(s) 104 to perform the operations described herein. Further, the manipulation system 102 includes the robotic arm 108 and the end effector 110, which is disposed on an end of the robotic arm 108 and is configured to move, grab, or otherwise manipulate item(s) within the environment 100. In some examples, the robotic arm 108 may have any number of degrees of freedom (e.g., six). The end effector 110 may include any suitable end effector for grasping the item(s), such as suction, grippers, and so forth.

The sensor(s) 116 are arranged around (e.g., vertically above, horizontally besides, etc.) the robotic arm 108 so as to view the item(s) being manipulated by the robotic arm 108 and the end effector 110. In some examples, the sensor(s) 116 may be coupled directly to the robotic arm 108 such that the sensor(s) 116 move with the robotic arm 108. In some examples, the sensor(s) 116 are components of the manipulation system 102, or may be components (e.g., devices) that are separate from the manipulation system 102. In such examples, the sensor(s) 116, or device(s) having the sensor(s) 116, may communicatively couple to the manipulation system 102 and/or the control system 126. Any number of sensors (e.g., three, four, etc.) may be used to detect the defect(s).

The sensor(s) 116 may have different viewpoints, fields of view (FoV), orientations, and so forth of the robotic arm 108, the end effector 110, or the item(s) being manipulated. The different viewpoints of the sensor(s) 116 may increase an accuracy of the manipulation system 102 detecting the defect(s) during manipulation, for example, given potential occlusions. In some examples, the sensor(s) 116 represent cameras that capture videos and/or images in the form of sensor data 118. The cameras, in some examples, may be 3D sensors that are used to determine a size, shape, position, and so forth of an item in 3D space. Additionally, or alternatively, the cameras may represent RGBD sensors that produce color images of the item augmented with depth information. However, the sensor(s) 116 may represent other types of sensor(s), such as a millimeter wave camera, a short wave infrared camera, multi-spectral cameras, a weight sensor, and so forth.

In some examples, the sensor(s) 116 represent scanner(s) that are arranged to scan an identifier (e.g., barcode, UPC, QR, etc.) on the item. If an identifier is located and scanned, the scanned identifier may be used to identify the item and determine characteristic(s) 200 of the item (e.g., weight, dimensions, packaging, etc.). That is, based on identifying the item being manipulated, the characteristic(s) 200 of the item may be determined. Such characteristic(s) 200 may be useful when determine whether defect(s) 202 are present. For example, the characteristic(s) 200 as determined from imaging the identifier may be compared against characteristic(s) 200 identified in the sensor data 118 and using the machine-learned model(s) 122.

More particularly, to detect the defect(s) 202, the sensor data 118 generated by the sensor(s) 116 may be input into the machine-learned model(s) 122. In some examples, the machine-learned model(s) 122 are trained to identify the characteristic(s) 200 of the item for determining the defect(s) 202, such as whether packaging of the item is torn, whether the packaging is open, whether contents of the item are falling from the packaging, whether the item was dropped, whether multiple items were picked, whether the wrong item was picked, whether no item was picked, and so forth. However, it is to be understood that the item(s) may include other characteristic(s) that are used for determining whether item(s) include defect(s) or whether the items do not include defect(s) 202. In some examples, the machine-learned model(s) 122 are configured to determine the type of defect(s) 202 based on the characteristic(s) 200, such as whether the item deconstructed. The machine-learned model(s) 122 may be configured to process, in parallel, sensor data 118 captured by the multiple sensor(s) 116 for determining the characteristic(s) 200 and whether the sensor data 118 is indicative of defect(s) 202.

In some examples, the machine-learned model(s) 122 may determine, based on the characteristic(s) 200, a probability, or score 204, that the item contains defect(s) 202 or does not contain defect(s) 202. The score 204 may relate to a probability or likelihood that an item contains defect(s) 202 or does not contain defect(s) 202. In other words, the scores 204 output by the machine-learned model(s) 122 may be machine-learned scores. Machine learning generally involves processing a set of examples (called "training data") in order to train a machine learning model(s). A machine learning model(s), once trained, is a learned mechanism that can receive new data as input and estimate or predict a result as output. For example, a trained machine learning model may comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model may be trained to infer a probability, or a set of probabilities, for a classification task based on unknown data received as input.

In the context of the present disclosure, the unknown input may be the sensor data 118 that is associated with a particular item being manipulated, and the machine-learned model(s) 122 may be tasked with outputting the score 204 that indicates, or otherwise relates to, a probability of the item containing defect(s) 202 or not containing defect(s) 202. The score 204 that is output by the machine-learned model(s) 122 may relate to either of these probabilities in order to guide manipulation. In some examples, the score 204 may be associated with the item containing any defect(s), or may be associated with the item containing a specific defect (e.g., ripped package, contents falling out, etc.). If the probability satisfies a certain confidence threshold, the item may be deemed to not have defect(s) 202. If defect(s) 202 are present, the manipulation system 102 may determine to one or more action(s) 124 to perform. If the score 204 that is output by the machine-learned model(s) 122 relates to a likelihood that the item includes defect(s) 202, this may be used to trigger one or more action(s) 124.

In some examples, the action(s) 124 may include refraining from processing the item, such as placing the item back into an originating container, calling attention to personnel to manually sort the originating container (which may contain contents of the item that fell out during manipulation (e.g., picking)), calling attention to personnel to manually repackage the item, sort the first container for further processing, and so forth. In instances in which multiple items were picked or the wrong item was picked, the action(s) 124 may include releasing the item(s) back into the container and grasping another item. These action(s) 124, when performed, serve to reduce inefficiencies in further processing the defected item. In some examples, the action(s) 124 performed may be based on the type of defect(s) 202 detected.

The manipulation system 102 may communicate with the control system 126 over the network(s) 130 and using one or more network interface(s) 206. Likewise, the control system 126 includes one or more network interface(s) 208. As shown, the control system 126 may have processor(s) 210 and memory 212, where the processor(s) 210 may perform various functions and operations associated with determining defect(s) 202 of items, and the memory 212 may store instructions executable by the processor(s) 210 to perform the operations described herein. In some examples, the control system 126 may be tasked with training the machine-learned model(s) 122 using a training component 214 and historical data 216. For example, the machine-learned model(s) 122 may be trained from a database (e.g., the historical data 216, such as image data and/or video data), of past items that were processed and which contained or did not contain defect(s) 202 to analyze the sensor data 118 captured by the sensor(s) 116 for identifying characteristic(s) 200 of the item. Thus, after analyzing the sensor data 118, the characteristic(s) 200 may be determined, which in turn, may be used for determining whether the item contains defect(s) 202. These characteristic(s) 200 may also be used to train and/or retrain the machine-learned model(s) 122.

The historical data 216 that is used to train the machine-learned model(s) 122 may include various types of data. In general, the historical data 216 for machine learning may include two components, features and labels. However, in some instances, the training data used to train the machine-learned model(s) 122 may be unlabeled. Accordingly, the machine-learned model(s) 122 may be trainable using any suitable learning technique, such as supervised learning, unsupervised learning, semi-supervised learning, reinforcement learning, and so on. The features included in the training data can be represented by a set of features, such as in the form of an n-dimensional feature vector of quantifiable information about an attribute of the historical data 216. The following is a list of example features that can be included in the historical data 216 for training the machine-learned model(s) 122 described herein. However, it is to be appreciated that the following list of features is non-exhaustive, and features used in training may include additional features not described herein, and, in some cases, some, but not all, of the features listed herein. Example features included in the historical data 216 may include, without limitation, a size of the item, a shape of the item, a shape of packaging of the item, a size of packaging of the item, whether content(s) of the item are identified as falling out of the packaging (e.g., between frames), a weight of the item, a material of the packaging, a material of the item, whether multiple items were grasped, whether no items were grasped, a type of item, and so forth. In some instances, the features included within the historical data 216 may be associated with items that did not contain defect(s) 202 and/or items that contained defect(s) 202.

In some examples, as part of the training process, weights may be applied to a set of features included in the historical data 216. In some instances, the weights that are set during the training process may apply to parameters that are internal to the machine-learned model(s) 122 (e.g., weights for neurons in a hidden-layer of a neural network). These internal parameters of the machine-learned model(s) 122 may or may not map one-to-one with individual input features of the set of features. The weights may indicate the influence that any given feature, parameter, or characteristic has on the score 204 that is output by the machine-learned model(s) 122.

The machine-learned model(s) 122 may represent a single model or an ensemble of base-level machine learning models, and may be implemented as any type of machine learning model. For example, suitable machine learning models for use with the techniques and systems described herein include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The machine-learned model(s) 122 may learn to identify complex relationships between characteristic(s) 200 of the item(s), or more generally, features of the sensor data 118 to determine the presence of defect(s). For example, the machine-learned model(s) 122 may learn to associate certain characteristic(s) 200 of the item with one another to indicate whether the item contains defect(s) 202. The machine-learned model(s) 122 herein allow for generating the scores 204 that more accurately predict whether the item contains defect(s) 202 in order to quickly, and accurately, identify the defect(s) 202 of the item for increasing throughout. In some instances, the machine-learned model(s) 122 may learn to predict which of the items are likely to include defect(s) 202, and which item(s) are not likely to include defect(s) 202 by attributing corresponding scores 204 to the individual item(s). In this manner, items with low scores (e.g., below threshold) may include defect(s) 202, while item(s) with high scores (e.g., above threshold) not include defect(s) 202. Although the use of a threshold is described as one example way of providing labeling, other techniques are contemplated, such as clustering algorithms, or other statistical approaches that use the trust scores for use in determining whether item(s) contain defect(s) 202.

The machine-learned model(s) 122 is/are retrainable with new data in order to adapt the machine-learned model(s) 122 to understand item(s) having defect(s) 202, as the characteristic(s) 200 of the item(s) change, or new correlations become available. For example, the control system 126 may receive the sensor data 118 from the manipulation system 102 (or the sensor(s) 116) in order to retrain the machine-learned model(s) 122.

After the machine-learned model(s) 122 have been trained, in such instances, the control system 126 may transmit the machine-learned model(s) 122 to the manipulation system 102 for use in determining item(s) with defect(s) 202. This may allow the manipulation system 102 to determine whether the item(s) contain defect(s) 202 in real-time. However, in some instances, the control system 126 may determine the item(s) with defect(s) 202, using information received from the manipulation system 102 (e.g., the sensor data 118), and then transmit indications back to the manipulation system 102 as to whether the item(s) contain defect(s) 202. Therein, the manipulation system 102 may control manipulation of the item.

As shown, the memory 212 may further store or have access to facility data 218. The facility data 218 may be associated with a facility, or the environment 100, in which the manipulation system 102 located. For example, the facility data 218 may indicate a location of the manipulation system 102, inbound stations, outbound stations, inventory locations, locations of conveyors, and so forth.

Although the manipulation system 102 and the control system 126 are shown including certain components, and described as performing certain operations, any level of split processing may occur between the manipulation system 102 and the control system 126, and/or other devices/systems not shown. That is, any number of the operations described herein may be performed by the manipulation system 102, and any number of the operations described herein may be performed by the control system 126.

In some examples, the control system 126 may be implemented as one or more servers and may, in some instances, form a portion of a network-accessible computing platform implemented as a computing infrastructure of processors, storage, software, data access, etc. that is maintained and accessible via a network such as the Internet. Common expressions associated with the control system 126 include "on-demand computing", "software as a service (Saas)", "platform computing", "network-accessible platform", "cloud services", "data centers", etc.

As used herein, a processor, such as the processor(s) 104 and/or the processor(s) 210 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 106 and/or the memory 212 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 3:
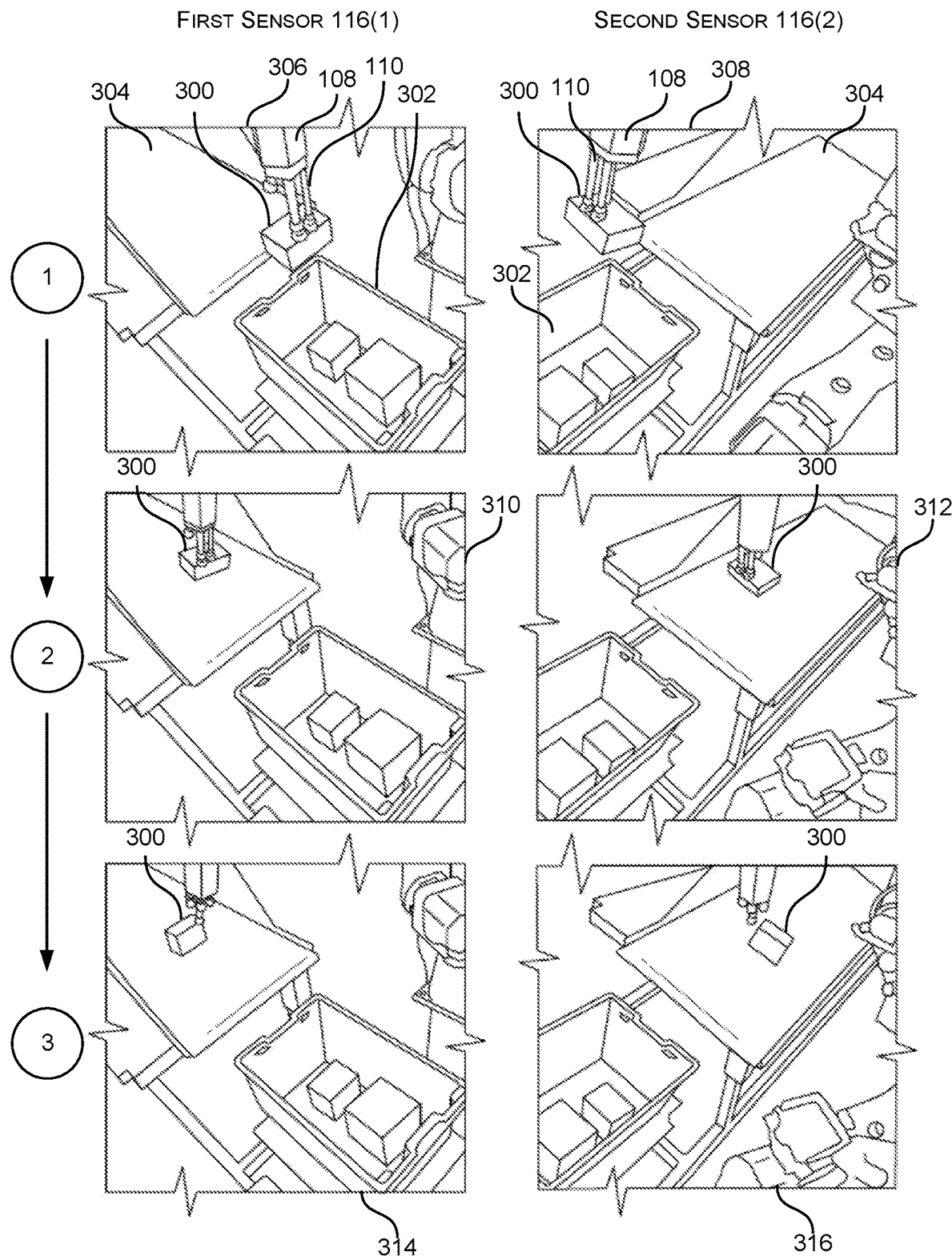
FIG. 3 illustrates an example scenario for detecting defects, using sensor data generated from multiple sensors, according to an example of the present disclosure.

FIG. 3 illustrates sensor data 118 collected from different sensor(s) 116 of the manipulation system 102, such as the first sensor 116(1) and the second sensor 116(2). As shown, the sensor(s) 116 may have different viewpoint(s) of an item 300 being processed. In FIG. 3, the item 300 is shown being processed from a container 302 to a conveyor system 304 via the robotic arm 108 and the end effector 110. Throughout manipulation of the item 300, the first sensor 116(1) and the second sensor 116(2) may generate sensor data 118 that is analyzed by the machine-learned model(s) 122 to determine the presence of defect(s).

At "1" the item 300 may be lifted out of the container 302. At this point, first video data 306 and second video data 308 indicate the presence of the item 300 being held by the robotic arm 108 and the end effector 110. In some examples, while the item 300 is positioned out of the container 302, the first sensor 116(1) and the second sensor 116(2) may capture the first video data 306 and the second video data 308, respectively. The first video data 306 and the second video data 308 are input into machine-learned model(s) 122 for determining whether the item 300 includes one or more defect(s). As shown at "1", no defects may be detected and as such, the manipulation system 102 may continue to process the item 300.

At "2" the robotic arm 108 may swivel, rotate, or otherwise manipulate in a direction towards the conveyor system 304. As the robotic arm 108 swivels, third video data 310 is captured by the first sensor 116(1) and fourth video data 312 is captured by the second sensor 116(2). Here, the first video data 306 and the third video data 310 may be provided as an input to the machine-learned model(s) 122, and the second video data 308 and the fourth video data 312 may be provided as an input to the machine-learned model(s) 122. That is, throughout manipulation of the item 300, the manipulation system 102 may determine whether defects are present. To make this determination, using the first video data 306 and the third video data 310, the machine-learned model(s) 122 may determine differences between the item as depicted in the first video data 306 and the third video data 310. If differences exist, or changes in the characteristic(s) are determined, the item 300 may have a defect. The same is true for the machine-learned model(s) 122 using the second video data 308 and the fourth video data 312. The machine-learned model(s) 122 may determine differences between the item as depicted in the second video data 308 and the fourth video data 312. If differences exist, or changes in the characteristic(s) are determined, the item 300 may have a defect. At this point, if a defect is present, the robotic arm 108 may be instructed to return to the container 302, place the defected item into a third container (not shown in FIG. 1), place the defected item into another container, call for assistance, and/or other actions. If no defect is present, the manipulation system 102 may continue to manipulate the robotic arm 108 to the conveyor system 304.

At "3", the item 300 may be dropped, placed, or otherwise put onto the conveyor system 304. That is, if no defects were detected, the item 300 may be processed and placed onto the conveyor system 304. At this instance, however, fifth video data 314 is captured by the first sensor 116(1) and sixth video data 316 is captured by the second sensor 116(2). Here, the first video data 306, the third video data 310, and the fifth video data 314 may be provided as an input into the machine-learned model(s) 122 for determining whether the item contains any defect(s), and the second video data 308, the fourth video data 312, and the sixth video data 316 may be provided as in input to the machine-learned model(s) 122 for determining whether the item contains any defect(s). Providing the video data, as captured at the three difference instances (e.g., at "1," "2," and "3"), the machine-learned model(s) 122 may determine whether any differences exists that are indicative of defects. As such, the machine-learned model(s) 122 may compare the first video data 306, the third video data 310, and the fifth video data 314, for example, to determine the presence of defects. Furthermore, the fifth video data 314 and the sixth video data 316 may confirm that the item 300 was placed onto the conveyor system 304 (as compared to being dropped by the robotic arm 108).

As such, FIG. 3 illustrates a scenario in which no defect(s) were detected, throughout the manipulation process, and as such, the item is processed. Such determination is aided by the different viewpoints of the item 300 to ensure the accuracy in detecting defect(s). Although FIG. 3 illustrates that the video data is captured at certain instances, the video data may be captured at different instances and/or a different amount of instances. In such examples, the machine-learned model(s) may receive any number of separate video data for comparison to determine whether defect(s) exist. For example, after the robotic arm 108 drops the item 300 onto the conveyor system 304, the machine-learned model(s) 122 may determine whether any defects are present.

Figure 4A:
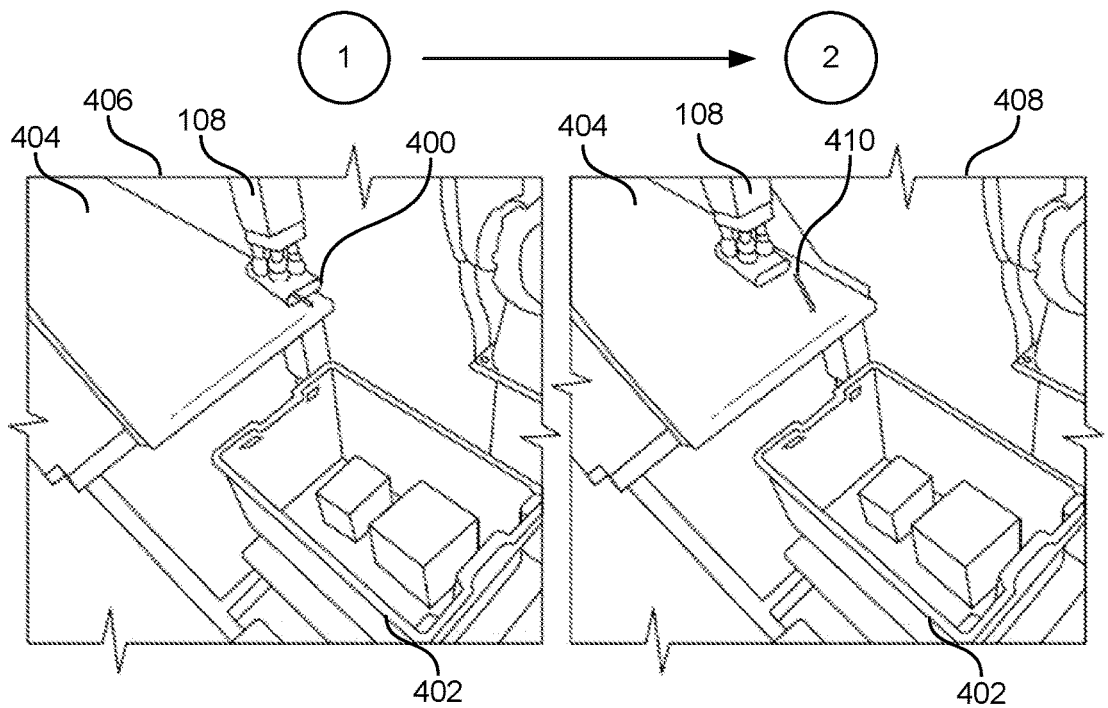
FIG. 4A illustrates an example scenario for detecting defects, according to an example of the present disclosure.

FIG. 4A illustrates an example scenario of detecting a defect associated with an item 400 being manipulated. In some examples, the defect shown in FIG. 4A is associated with contents of the item falling out during manipulation.

At "1", the robotic arm 108 is shown manipulating the item in a direction from a container 402 to a conveyor system 404. First video data 406 captured at "1" may be input into the machine-learned model(s) 122 to identify first characteristic(s) of the item 400. For example, the first characteristic(s) 200 may include a size, shape, and so forth the item 400. As the item 400 continues to be manipulated, second video data 408, for example, may be captured at "2." The first video data 406 and the second video data 408 may be input into the machine-learned model(s) 122 to determine whether defect exist and whether the item 400 has changed between the first video data 406 captured at "1" and the second video data 408 captured at "2." More particularly, the second video data 408 may be analyzed by the machine-learned model(s) 122 to identify second characteristic(s) of the item 400. Therein, the second characteristic(s) may be compared against the first characteristic(s) to determine whether the item 400 contains any defect(s). For example, via the second video data 408, the machine-learned model(s) 122 may identify an article 410 (content) of the item 400 falling out of packaging of the item 400. Such characteristic, or indication, may not have been present in the first video data 406, and such indication may be used to determine the defect(s). That is, the comparison between the first video data 406 and the second video data 408, the machine-learned model(s) 122 may determine a foreign object (e.g., the article 410), and the foreign object may be determined to have fallen out of packaging of the item 400. Noted above, the determination that the article 410 is a foreign object may be based on the article not being identified in the first video data 406. As such, by providing the first video data 406 and the second video data 408 to the machine-learned model(s) 122, the machine-learned model(s) 122 is configured to identify differences therebetween for determining the presence of defects.

In such instances, based on detecting the defect, the robotic arm 108 may return to place the item 400 within the container 402, or may perform one or more other action(s) 124, such as a dispatching personnel to repackage the article 410 into the item 400.

Figure 4B:
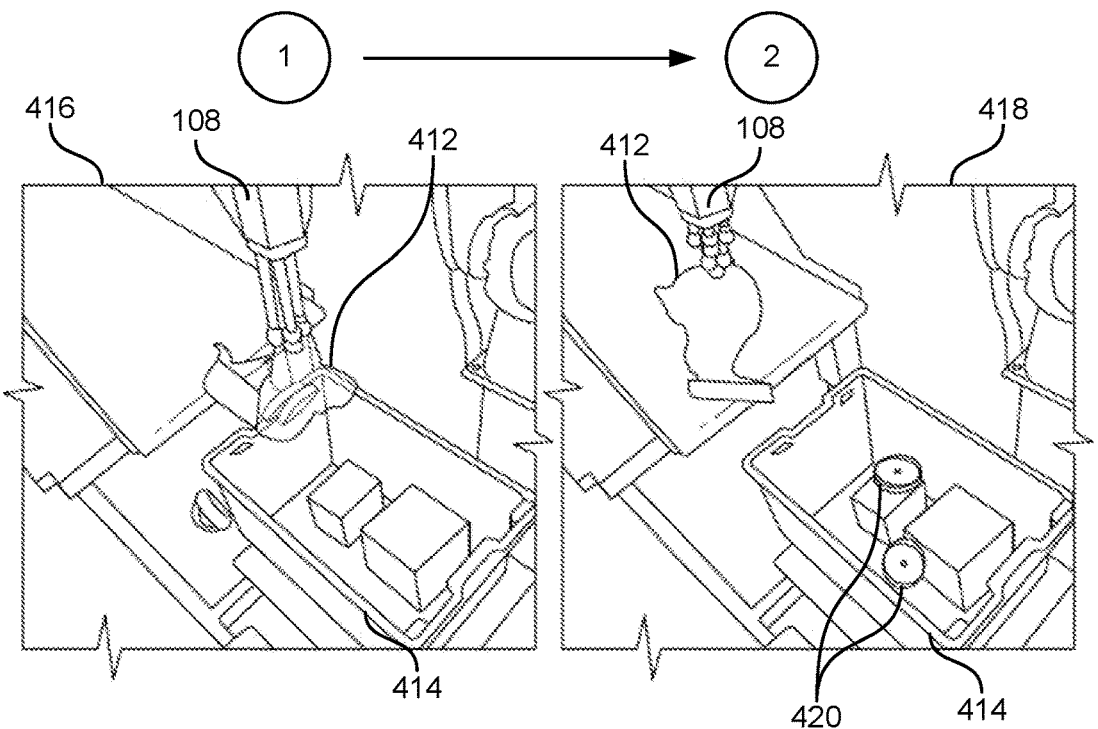
FIG. 4B illustrates an example scenario for detecting defects, according to an example of the present disclosure.

FIG. 4B illustrates an example scenario of detecting a defect associated with an item 412 being manipulated. In some examples, the defect shown in FIG. 4B is associated with packaging of the item 412 deconstructing.

At "1", the robotic arm 108 is shown picking the item 412 out of a container 414. First video data 416 captured at "1" may be input into the machine-learned model(s) 122 to identify first characteristic(s) of the item 412. For example, the first characteristic(s) may include a size, shape, and so forth the item. As the item 400 continues to be manipulated, second video data 418, for example, may be captured at "2." The second video data 418 may be input into the machine-learned model(s) 122 to identify second characteristic(s) of the item 412.

The second characteristic(s) are compared against the first characteristic(s) to determine whether the item 412 contains any defect(s). For example, via providing the first video data 416 and the second video data 418 into the machine-learned model(s) 122, the machine-learned model(s) 122 may identify that contents 420 of the item 400 fell out of packaging of the item 412. In such instances, the item 412 may have a different shape, size, and so forth. Moreover, the comparison between the first video data 416 and the second video data 418 may indicate a foreign object(s), such as the contents 420 of the item 412, falling out of packaging of the item 412. In such instances, based on detecting the defect, the robotic arm 108 may return to place the item 412 within the container 414, or may perform one or more other action(s) 124, such as a dispatching personnel to repackage the contents 420 into the item 412.

In some examples, in FIGS. 4A and 4B, characteristic(s) 200 of the item 400 and the item 412 may be determined based on scanning an identifier (e.g., barcode). For example, by scanning the identifier, the machine-learned model(s) 122 may know reference characteristic(s) of the item 400 and the item 412, and such reference characteristic(s) may be compared against the characteristic(s) determined from the sensor data 118. If a deviation exists, or if the characteristic(s) are not comparable, this may be indicative of a defect.

FIGS. 5-10 illustrate various processes related to detecting defect(s) within item(s) being manipulated. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4B, although the processes may be implemented in a wide variety of other environments, architectures and systems.

Figure 5:
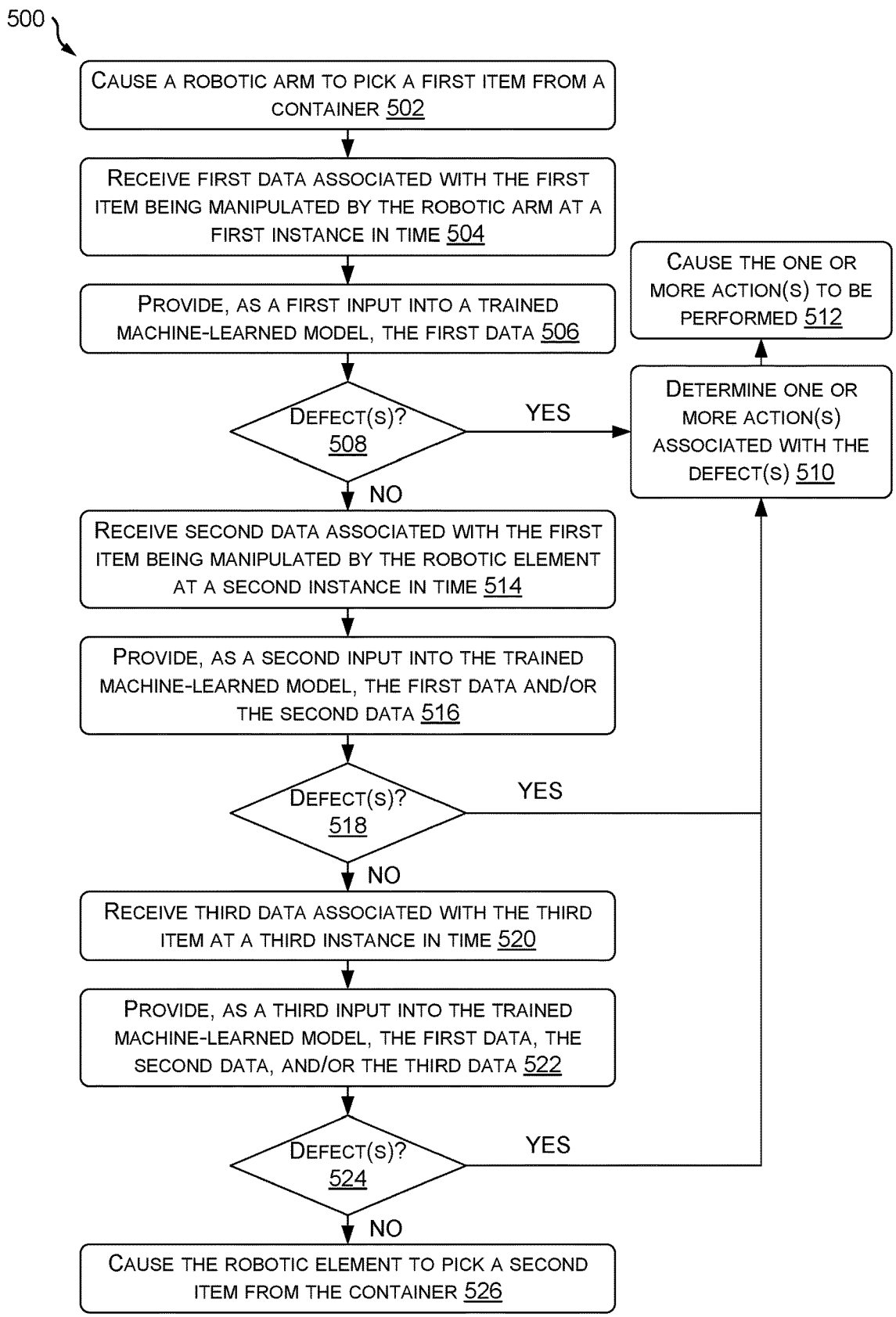
FIG. 5 illustrates an example process for detecting defects, according to an example of the present disclosure.

FIG. 5 illustrates an example process 500 for determining whether defects are present within an item being manipulated.

At 502, the process 500 may include causing a robotic arm to pick a first item from a container. For example, the robotic arm 108 may be instructed to pick an item from a container. The container may include a plurality of items, and the robotic arm 108 (via the end effector 110) may be configured to identify the item within the container. In some examples, the item may be selected at random, or the item may be selected based on certain criteria (e.g., size, weight, shape, top-most item in the container, closest item to the robotic arm 108, and so forth). Examples of identifying item(s) and/or a grasping location of item(s) is disclosed in, for example, U.S. patent application Ser. No. 17/209,594, filed Mar. 23, 2021, the entirety of which is herein incorporated by reference for all its purposes.

One or more sensor(s) 116, such as camera(s) arranged around the robotic arm 108 or within an environment of the robotic arm 108 may image the container for instructing the robotic arm 108 as to the position of the item. In turn, the position is used to control the robotic arm 108. For example, the cameras, in some examples, may be 3D sensors that are used to determine a size, shape, position, and so forth of an item in 3D space. The sensor(s) 116 may image (e.g., scan) an item to determine coordinates that represents the size, shape, and/or position of the item in 3D space. These coordinates may reveal the boundaries of the item in the 3D space for determining the size, shape, and position of the item. Such sensor data 118 may be used to assist the robotic arm 108 in determining the location of an item within the container, for example, such that the robotic arm 108 may grab the item.

At 504, the process 500 may include receiving first data associated with the first item being manipulated by the robotic arm at a first instance in time. For example, the sensor(s) 116, whether the same or different sensor(s) 116 that were used to determine the position of the item for instructing the robotic arm 108, may generate first sensor data associated with the item. The sensor data 118 may represent video data and/or image data of the item, a portion of the environment of the item, the robotic arm 108, the end effector 110, and so forth. In some examples, the first instance in time occurs when the robotic arm 108 and the end effector 110 are outside of the container or are in the process of lifting the item out of the container.

At 506, the process 500 may include providing, as a first input into a trained machine-learned model, the first data. For example, the sensor data 118 generated by the sensor(s) 116 may be provided to the machine-learned model(s) 122. The machine-learned model(s) 122 are configured to process the sensor data 118 to determine whether any defect(s) are present, or associated with the item. For example, the machine-learned model(s) 122 may determine characteristic(s) of the item (e.g., size, shape, etc.) for use in determining whether the item contains defect(s). Additionally, or alternatively, the machine-learned model(s) 122 may determine whether more than one item was picked by the robotic arm 108, whether any items were picked by the robotic arm 108, whether packaging of the item(s) has opened or is torn, whether contents of the item are falling out from the packaging, and so forth. The machine-learned model(s) 122 are previously trained to determine the presence of such defect(s), for example, by comparing the characteristic(s) and/or the sensor data 118 to reference characteristic(s) and/or reference data, respectively.

At 508, the process 500 may include determining whether any defect(s) are present. For example, the machine-learned model(s) 122 may output an indication of whether the item contains any defect(s). In some examples, the indication may be whether the item contains any defect(s), or whether the item contains a specific defect (e.g., ripped package, contents falling out, etc.). Additionally, if multiple items were picked by the robotic arm 108, if an item was failed to be picked, and/or or if the wrong item was picked, a defect may be determined. If at 508 the process 500 determines that the item contains defect(s), the process 500 may follow the "YES" route and proceed to 510. For example, the machine-learned model(s) 122 may determine that contents of the item are falling or fell out of packaging of the item.

At 510, the process 500 may include determining one or more action(s) associated with the defect(s). For example, one or more the action(s) 124 may be determined based on the machine-learned model(s) 122 determining the defect(s) 202. For example, if during picking an item the packaging of the item becomes torn and/or contents of the item are falling out of the packaging, the item may be released back into the container. This may avoid having contents of the item(s) scattered across the environment, or between multiple locations. Instead, the contents may be consolidated within the container (or at a single location). Additionally, the container may be flagged for human manipulation (e.g., sortation). If the defect includes a failure to pick the item, the robotic arm 108 may reattempt to pick the item (or another item) from the container. If multiple items were picked, the robotic arm 108 may release the items back into the container and reattempt to pick a single item. In some examples, the action(s) 124 that are determined may be based at least in part on the type of detected defect.

At 512, the process 500 may include causing the one or more action(s) to be performed. For example, the robotic arm 108 may be instructed to perform the action(s) 124 and/or personnel within the environment may be contacted for performing the action(s) 124 (e.g., via a device of the personnel). In some examples, the action(s) 124 may be performed consecutively, or in parallel. For example, in instances where the packaging of the item rips and contents of the item are displaced from the packaging, the item may be placed back into the container and personnel may be dispatched for manually sorting the container.

Returning to 508, if the process 500 determines that no defect(s) were detected, the process 500 may follow the "NO" route and proceed to 514. At 514, the process 500 may include receiving second data associated with the first item being manipulated by the robotic arm at a second instance in time. For example, the sensor(s) 116 may generate second sensor data associated with the item. The second instance in time may be after, or subsequent to, the first instance in time. The sensor data 118 may represent video data and/or image data of the item, a portion of the environment of the item, the robotic arm 108, the end effector 110, and so forth. In some examples, the second instance in time occurs while the robotic arm 108 is manipulating (e.g., swiveling) in a direction towards a conveyor system on which the item is to be transferred. In other words, the sensor data 118 received at 514 may be while the robotic arm 108 is articulating in a direction towards the conveyor system.

At 516, the process 500 may include providing, as a second input into the trained machine-learned model, the first data and/or the second data. For example, the sensor data 118 generated by the sensor(s) 116 may be provided to the machine-learned model(s) 122. As similarly discussed above with regard to 506, the machine-learned model(s) 122 are configured to process the sensor data 118 to determine whether any defect(s) are present, or associated with the item. At 516, however, the machine-learned model(s) 122 may process the sensor data (from 504) and additional sensor data 118 (from 514) for determining whether any defect(s) are presence (e.g., between the first instance in time and the second instance in time), or whether any defect(s) are now detectable. For example, between the item being picked from the container and the robotic arm 108 moving, one or more defect(s) may occur. As such, the sensor data 118 is continuously generated by the sensor(s) 116 throughout manipulation of the item and provided as an input into the machine-learned model(s) 122. In this sense, the machine-learned model(s) 122 continuously process the sensor data 118 to determine the presence of defect(s) during manipulation of the item.

At 518, the process 500 may include determining whether any defect(s) are present. For example, the machine-learned model(s) 122 may output an indication of whether the item contains any defect(s). In some examples, the indication may be whether the item contains any defect(s), or whether the item contains a specific defect (e.g., ripped package, contents falling out, etc.). If at 518 the process 500 determines that the item contains defect(s), the process 500 may follow the "YES" route and proceed to 510. Alternatively, if the process 500 determines that no defect(s) were detected, the process 500 may follow the "NO" route and proceed to 520.

At 520, the process 500 may include receiving third data associated with the first item being manipulated by the robotic arm at a third instance in time. For example, the sensor(s) 116 may generate third sensor data associated with the item. The third instance in time may be after, or subsequent to, the second instance in time. The sensor data 118 may represent video data and/or image data of the item, a portion of the environment of the item, the robotic arm 108, the end effector 110, and so forth. In some examples, the third instance in time occurs after the robotic arm 108 has placed the item onto the conveyor system, while the robotic arm 108 is about to place the item onto the conveyor system (e.g., residing above the conveyor system, etc.), and so forth.

At 522, the process 500 may include providing, as a third input into the trained machine-learned model, the first data, the second data, and/or the third data. For example, the sensor data 118 generated by the sensor(s) 116 may be provided as an input to the machine-learned model(s) 122. As similarly discussed above with regard to 506 and 516, the machine-learned model(s) 122 are configured to process the sensor data 118 to determine whether any defect(s) are present, or associated with the item. At 522, however, the machine-learned model(s) 122 may process the sensor data from 504, 514, as well as additional sensor data 118 from 520 for determining whether any defect(s) are presence (e.g., between the first instance in time, the second instance in time, and the third instance in time), or whether any defect(s) are now detectable. For example, between the item being picked moved to the conveyor system and being placed on the conveyor system, one or more defect(s) may occur. As such, the sensor data 118 is continuously generated by the sensor(s) 116 throughout manipulation of the item and provided as an input into the machine-learned model(s) 122.

At 524, the process 500 may include determining whether any defect(s) are present. For example, the machine-learned model(s) 122 may output an indication of whether the item contains any defect(s). In some examples, the indication may be whether the item contains any defect(s), or whether the item contains a specific defect (e.g., ripped package, contents falling out, etc.). If at 524 the process 500 determines that the item contains defect(s), the process 500 may follow the "YES" route and proceed to 510. Alternatively, if the process 500 determines that no defect(s) were detected, the process 500 may follow the "NO" route and proceed to 526.

At 526, the process 500 may include causing a robotic arm to pick a second item from the container. For example, the robotic arm 108 may be instructed to pick an item from a container. That is, after the robotic arm 108 may manipulated a first item, the robotic arm 108 may return to the container to manipulate a second item. In some examples, the item may be selected at random, or the item may be selected based on certain criteria (e.g., size, weight, shape, top-most item in the container, closest item to the robotic arm 108, and so forth).

Although the process 500 is described as manipulating the item out of a container and onto a conveyor system, for example, the item may be manipulated to and from other locations, such as between conveyor systems, between containers, and so forth. Additionally, the machine-learned model(s) 122 may receive sensor data generated by the sensor(s) 116 at other instances, which may be different than those described above. Additionally, the machine-learned model(s) 122 may be configured to process the sensor data 118 from any number of instances (e.g., four, five, etc.) to determine the presence of defects. That is, although the process 500 is describes as providing three instances of the sensor data 118 into the machine-learned model(s) 122, the machine-learned model(s) 122 may receive any number of the sensor data 118 for determining the presence of defects.

Figure 6:
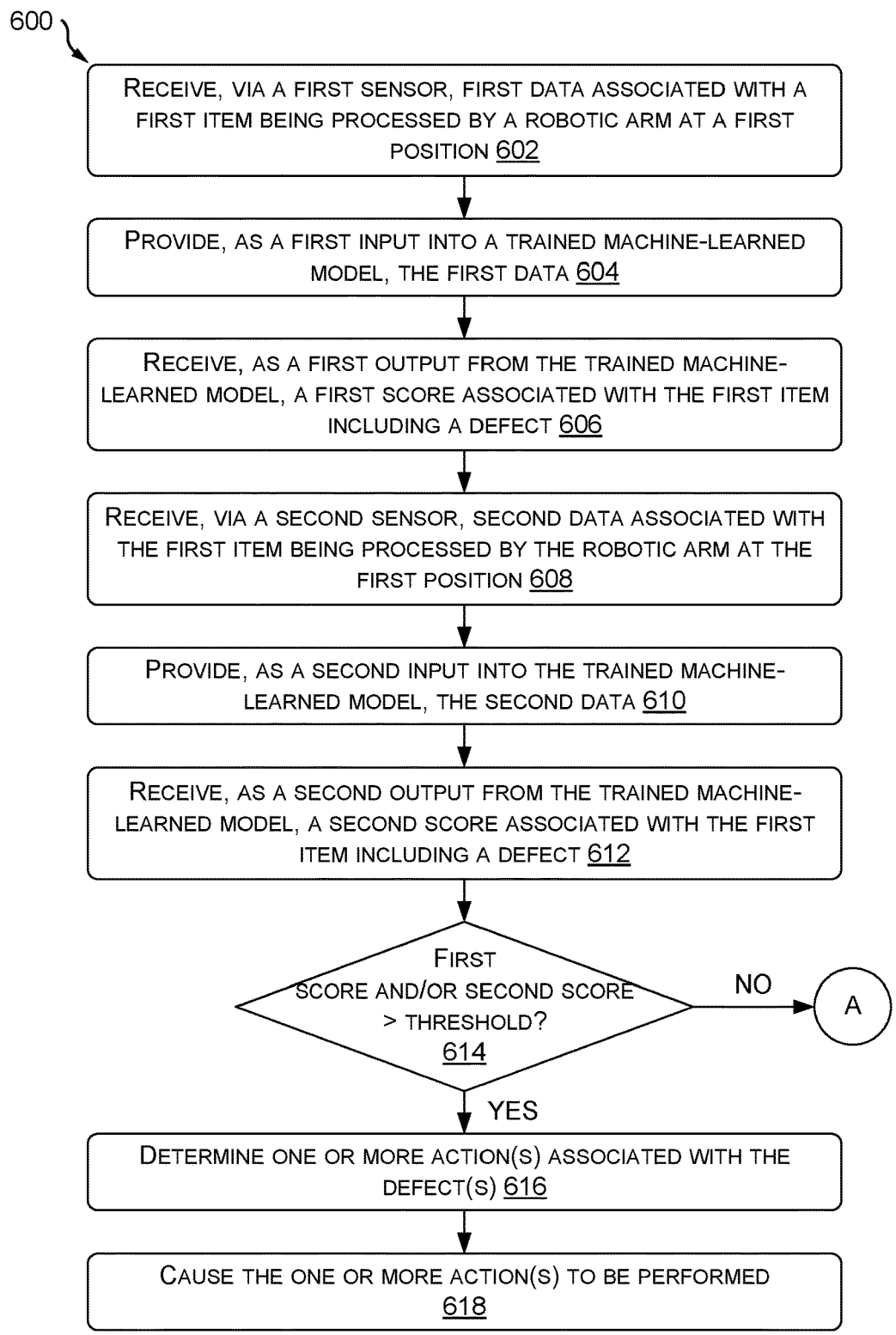
FIG. 6 illustrates an example process for detecting defects, according to an example of the present disclosure.

FIG. 6 illustrates an example process 600 for determining whether defects are present within an item being manipulated based on the machine-learned model(s) 122 outputting scores.

At 602, the process 600 may include receiving, via a first sensor, first data associated with a first item being processed by a robotic arm at a first position. For example, a first sensor of the one or more sensor(s) 116, such as a camera arranged around the robotic arm 108, may image a portion of the environment of the first item, the robotic arm 108, the end effector 110, and so forth. In some examples, the first data may be received upon the first item being picked from a container, or upon the robotic arm 108 retracting from the container. The first data may represent video data and/or image data of the first item. Additionally, the first sensor includes a first viewpoint within the environment.

At 604, the process 600 may include providing, as a first input into a trained machine-learned model, the first data. For example, the first data may be provided as an input to the machine-learned model(s) 122. The machine-learned model(s) 122 are configured to process the first data to determine whether any defect(s) are present, or associated with the first item. As part of this, the machine-learned model(s) 122 may determine characteristic(s) of the first item (e.g., size, shape, etc.) for use in determining whether the first item contains defect(s). Additionally, or alternatively, the machine-learned model(s) 122 may determine whether more than one item was picked by the robotic arm 108, whether any items were picked by the robotic arm 108, whether packaging of the first item has opened or is torn, whether contents of the first item are falling out from the packaging, and so forth. As such, the characteristic(s) may be indicative of whether the first item contain(s) any defect(s).

At 606, the process 600 may include receiving, as a first output from the trained machine-learned model, a first score associated with the first item including a defect. For example, the first score may relate to a probability of the first item including a defect, or not including a defect. In the case of the first item including a defect, a "high" score may relate to the probability of the first item including a defect. In the case of the first item not including a defect, a "low" score may relate to the probability of the first item not including a defect. However, different classifiers, or identifiers, may be used or associated with first item that are include a defect or do not include a defect.

In some examples, the machine-learned model(s) 122 may determine the first score based on determining characteristics of the first item via analyzing the first data. For example, the machine-learned model(s) 122 may learn to associate certain characteristics of the first item to determine whether the first item contains a defect. By way of example, based on the first item have certain characteristic(s), the machine-learned model(s) 122 may determine the presence of a defect. Example characteristic(s) may include a size of the item, a shape of the item, whether the item (or packaging thereof) is ripped, whether contents are defected falling out of the item (or packaging thereof), whether an item is being held by the end effector 110, whether multiple item(s) are being held by the end effector 110, and so forth. Based on the characteristic(s), the machine-learned model(s) 122 may learn to predict which items likely have defect(s), and which item(s) are unlikely to have defect(s) by attributing corresponding scores to the individual item(s).

At 608, the process 600 may include receiving, via a second sensor, second data associated with the first item being processed by the robotic arm at the first position. For example, a second sensor of the one or more sensor(s) 116, such as a camera arranged around the robotic arm 108, may image a portion of the environment of the first item, the robotic arm 108, the end effector 110, and so forth. In some examples, the second data may be received upon the first item being picked from the container, or upon the robotic arm 108 retracting from the container. The second data may represent video data and/or image data of the first item. Additionally, the second sensor includes a second viewpoint within the environment, that is different from the first viewpoint of the first sensor.

At 610, the process 600 may include providing, as a second input into the trained machine-learned model, the second data. For example, the second data may be provided as an input to the machine-learned model(s) 122. The machine-learned model(s) 122 are configured to process the second data to determine whether any defect(s) are present, or are associated with the first item. As part of this, the machine-learned model(s) 122 may determine characteristic(s) of the first item (e.g., size, shape, etc.) for use in determining whether the first item contains defect(s). Additionally, or alternatively, the machine-learned model(s) 122 may determine whether more than one item was picked by the robotic arm 108, whether any items were picked by the robotic arm 108, whether packaging of the item(s) has opened or is torn, whether contents of the first item are falling out from the packaging, and so forth. As such, the characteristic(s) may be indicative of whether the first item contain(s) any defect(s).

At 612, the process 600 may include receiving, as a second output from the trained machine-learned model, a second score associated with the first item including a defect. For example, the second score may relate to a probability of the first item including a defect, or not including a defect, such as whether multiple items were picked, whether the item was failed to be picked, whether the wrong item was picked, whether the packaging is open, whether the item is being crushed and/or otherwise damaged, and so forth. The second score may be based on determining characteristics of the first item via analyzing the second data. For example, the machine-learned model(s) 122 may learn to associate certain characteristics of the first item to determine whether the first item contains a defect. Based on the characteristic(s), the machine-learned model(s) 122 may learn to predict which items likely have defect(s), and which item(s) are unlikely to have defect(s) by attributing corresponding scores to the individual item(s).

At 614, the process 600 may include determining whether the first score and/or the second score is greater than a threshold. For example, the threshold may be associated with a likelihood of the first item containing a defect. The first score and/or the second score may be compared to the threshold, and if the first score and/or the second score are greater than the threshold, or satisfy the threshold, the first item may be determined to have a defect. In other words, if the first score and/or the second score are greater than the threshold, the process 600 may be confident in the first item containing a defect. Comparatively, if the first score and/or the second score are less than the threshold, or do not satisfy the threshold, the first item may not include a defect or the process 600 may be confident that the first item does not contain a defect.

In some examples, using the first score and/or second score to determine the defects may account for any occlusions that may occur during manipulation. For example, while being processed, portions of the robotic arm 108 may obstruct the view of the first sensor and/or the second sensor. As an additional example, the defect(s) may be detectable from the first viewpoint of the first sensor, but undetectable from the second viewpoint of the second camera. Having multiple sensor(s), with different viewpoints, may increase an accuracy of detecting the defect(s) during manipulation. Such process may be performed in parallel or in series. For example, steps 602-606 may be performed in parallel with 608-612.

In some examples, either or both of the first score (or the first data) or the second score (or the second data) may be used to determine the presence of the defect(s). In other examples, if one of the first score or the second score indicates that the first item contains a defect, such determination may be determinative (i.e., the first item may include a defect). In other words, even though the machine-learned model(s) 122 may not detect the defect from the first data, and the first score may indicate a low score (e.g., low likelihood that the first item contains a defect), possible defects may be occluded via the robotic arm (e.g., a structure thereof) and/or the defect may be located on another side of the first item not visible to the first sensor. In such instances, however, the machine-learned model(s) 122 may detect the defect(s) from the second score including a high score (e.g., high likelihood that the first item contains a defect).

If at 614 the process 600 determines that the first score and/or the second score are greater than the threshold, the process 600 may follow the "YES" route and proceed to 616. At 616, the process 600 may include determining one or more action(s) associated with the defect(s). For example, if during picking of the first item the packaging of the first item becomes torn and/or contents of the first item are falling out of the packaging, the first item may be released back into the container. This may avoid having contents of the first item scattered across the environment, or between multiple locations. Instead, the contents may be consolidated within the container (or at a single location). Additionally, the container may be flagged for human manipulation (e.g., sortation). If the defect includes a failure to pick the first item, the robotic arm may reattempt to pick the first item (or another item) from the container. If multiple items were picked, the robotic arm may release the items back into the container and reattempt to pick a single item. In some examples, the action(s) 124 that are determined may be based at least in part on the type of detected defect.

At 618, the process 600 may include causing the one or more action(s) to be performed. For example, the robotic arm 108 may be instructed to perform the action(s) 124 and/or personnel within the environment may be contacted for performing the action(s) 124 (e.g., via a device of the personnel). In some examples, the action(s) 124 may be performed consequently, or in parallel. For example, in instances where the packaging of the first item rips and contents of the first item are displaced from the packaging, the first item may be placed back into the container and personnel may be dispatched for manually sorting the container.

Figure 7:
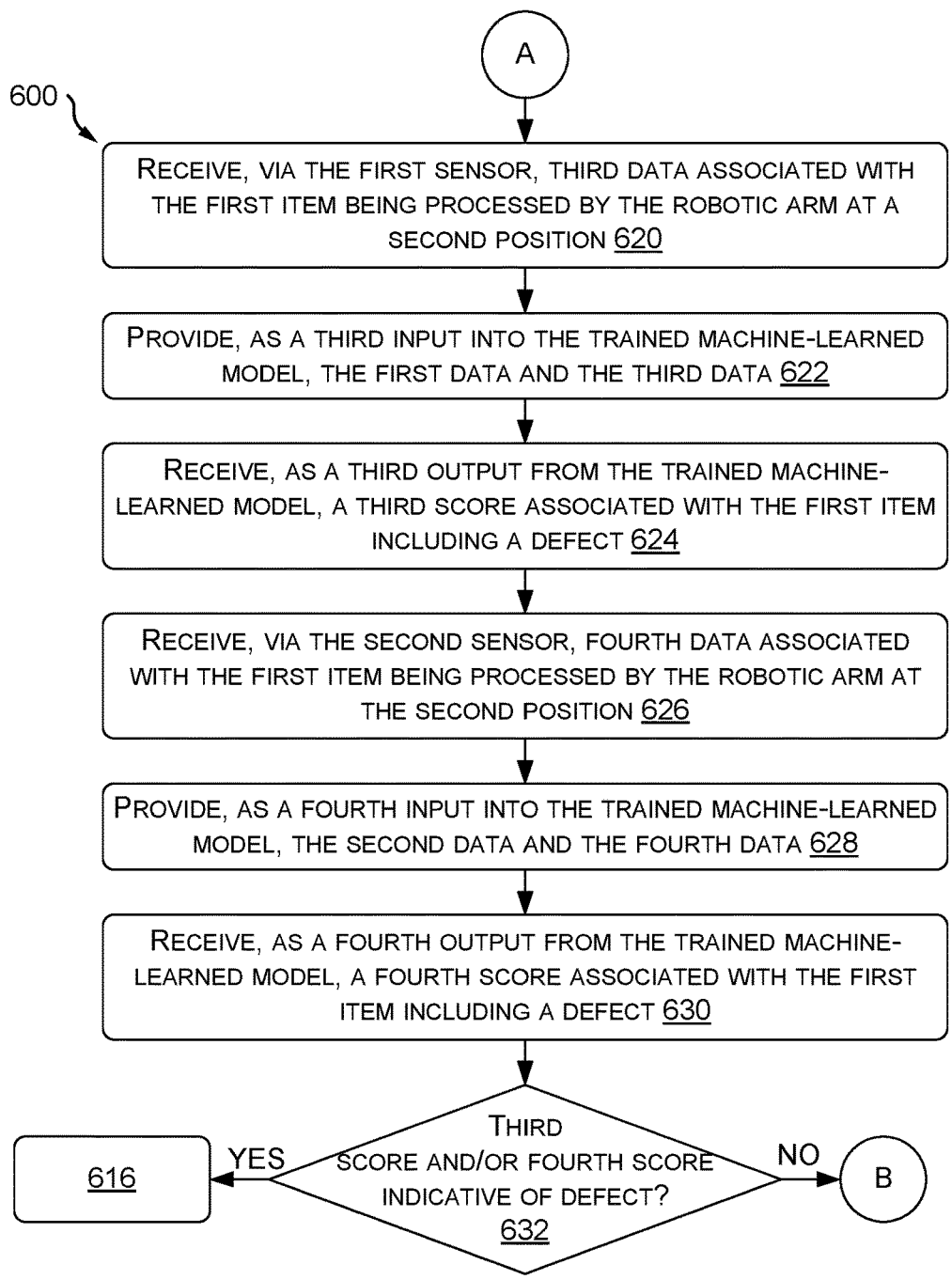
FIG. 7 illustrates a continuation of the process of FIG. 6, according to an example of the present disclosure.

Alternatively, if at 614 the process 600 determines that the first score and/or the second score do not satisfy the threshold, and that the first item is unlikely to contain a defect, the process 600 may follow the "NO" route and proceed to "A", which is discussed in FIG. 7.

FIG. 7 illustrates a continuation of the process 600 from "A" in FIG. 6. At 620, the process 600 may include receiving, via the first sensor, third data associated with the first item being processed by the robotic arm at a second position. For example, the first sensor may image a portion of the environment of the first item, the robotic arm 108, the end effector 110, and so forth. In some examples, the third data may be received upon the first item being picked manipulated from the container towards another container, conveyor system, or other transfer location. As such, the third data may be received subsequent (or after) the first data, while the first item is being manipulated and while the robotic arm 108 is in a different position than depicted in the first data.

At 622, the process 600 may include providing, as a third input into the trained machine-learned model, the first data and the third data. For example, the first data and the third data may be provided as an input to the machine-learned model(s) 122. The machine-learned model(s) 122 are configured to process the first data and the third data to determine whether any defect(s) are present, or associated with the first item. As part of this, the machine-learned model(s) 122 may determine characteristic(s) of the first item (e.g., size, shape, etc.) for use in determining whether the first item contains defect(s). Additionally, or alternatively, the machine-learned model(s) 122 may determine whether packaging of the first item has become open or torn, whether contents of the first item are falling out from the packaging, whether the first item was dropped, and so forth. As such, the characteristic(s) may be indicative of whether the first item contain(s) any defect(s). By providing the first data and the third data to the machine-learned model(s) 122, the machine-learned model(s) 122 are able to determine differences between the first item as depicted in the first data and the third data. As such, the machine-learned model(s) 122 may compare the first data and the third data to determine whether the first item contains any defects.

At 624, the process 600 may include receiving, as a third output from the trained machine-learned model, a third score associated with the first item including a defect. For example, the third score may relate to a probability of the first item including a defect, or not including a defect. In the case of the first item including a defect, a "high" score may relate to the probability of the first item including a defect. In the case of the first item not including a defect, a "low" score may relate to the probability of the first item not including a defect. As discussed above, in some examples, the machine-learned model(s) 122 may determine the third score based on determining characteristics of the first item via analyzing the third data, as well as the first data. For example, the machine-learned model(s) 122 may learn to associate certain characteristics of the first item to determine whether the first item contains a defect. Based on the characteristic(s), the machine-learned model(s) 122 may learn to predict which items likely have defect(s), and which item(s) are unlikely to have defect(s) by attributing corresponding scores to the individual item(s).

At 626, the process 600 may include receiving, via the second sensor, fourth data associated with the first item being processed by the robotic arm at the second position. For example, the second sensor may image a portion of the environment of the first item, the robotic arm 108, the end effector 110, and so forth. In some examples, the fourth data may be received upon the first item being picked manipulated from the container towards another container, conveyor system, or other transfer location. As such, the third data may be received subsequent (or after) the second data, while the first item is being manipulated and while the robotic arm is in a different position than depicted in the second data. In some examples, the fourth data may be captured at the same time, or at substantially the same time, as the third data.

At 628, the process 600 may include providing, as a fourth input into the trained machine-learned model, the second data and the fourth data. For example, the second data and the fourth data may be provided as an input to the machine-learned model(s) 122. The machine-learned model(s) 122 are configured to process the second data and the fourth data to determine whether any defect(s) are present, or are associated with the first item. As part of this, the machine-learned model(s) 122 may determine characteristic(s) of the first item (e.g., size, shape, etc.) for use in determining whether the first item contains defect(s). Additionally, or alternatively, the machine-learned model(s) 122 may determine whether packaging of the first item(s) has become open or torn, whether contents of the first item are falling out from the packaging, whether the first item was dropped, and so forth. As such, the characteristic(s) may be indicative of whether the first item contain(s) any defect(s). By providing the second data and the fourth data to the machine-learned model(s) 122, the machine-learned model(s) 122 are able to determine differences between the first item as depicted in the first data and the third data. As such, the machine-learned model(s) 122 may compare the second data and the fourth data to determine whether the first item contains any defects.

At 630, the process 600 may include receiving, as a fourth output from the trained machine-learned model, a fourth score associated with the first item including a defect. For example, the fourth score may relate to a probability of the first item including a defect, or not including a defect. The fourth score may be based on determining characteristics of the first item via analyzing the second data and the fourth data. For example, the machine-learned model(s) 122 may learn to associate certain characteristics of the first item to determine whether the first item contains a defect. Based on the characteristic(s), the machine-learned model(s) 122 may learn to predict which items likely have defect(s), and which item(s) are unlikely to have defect(s) by attributing corresponding scores to the individual item(s). In some examples, steps 620-624 may be performed in parallel with 626-630.

At 632, the process 600 may include determining whether the third score and/or the fourth score is greater than a threshold. For example, the threshold may be associated with a likelihood of the first item containing a defect. The third score and/or the fourth score may be compared to the threshold, and if the third score and/or the fourth score are greater than the threshold, or satisfy the threshold, the first item may be determined to have a defect. In other words, if the third score and/or the fourth score are greater than the threshold, the process 600 may be confident in the first item containing a defect. Comparatively, if the third score and/or the fourth score are less than the threshold, or do not satisfy the threshold, the first item may not include a defect or the process 600 may be confident that the first item does not contain a defect. In some examples, either or both of third score and the fourth score may be used to determine the presence of the defect(s). In other example, if one of the third score or the fourth score indicates that the first item contains a defect, such determination may be determinative (i.e., the first item may include a defect).

If at 632 the process 600 determines that the third score and/or the fourth score are greater than the threshold, the process 600 may follow the "YES" route and proceed to 616 (FIG. 6). Alternatively, if at 632 the process 600 determines that the third score and/or the fourth score do not satisfy the threshold, and that the first item is unlikely to contain a defect, the process 600 may follow the "NO" route and proceed to "B", which is discussed in FIG. 8.

Figure 8:
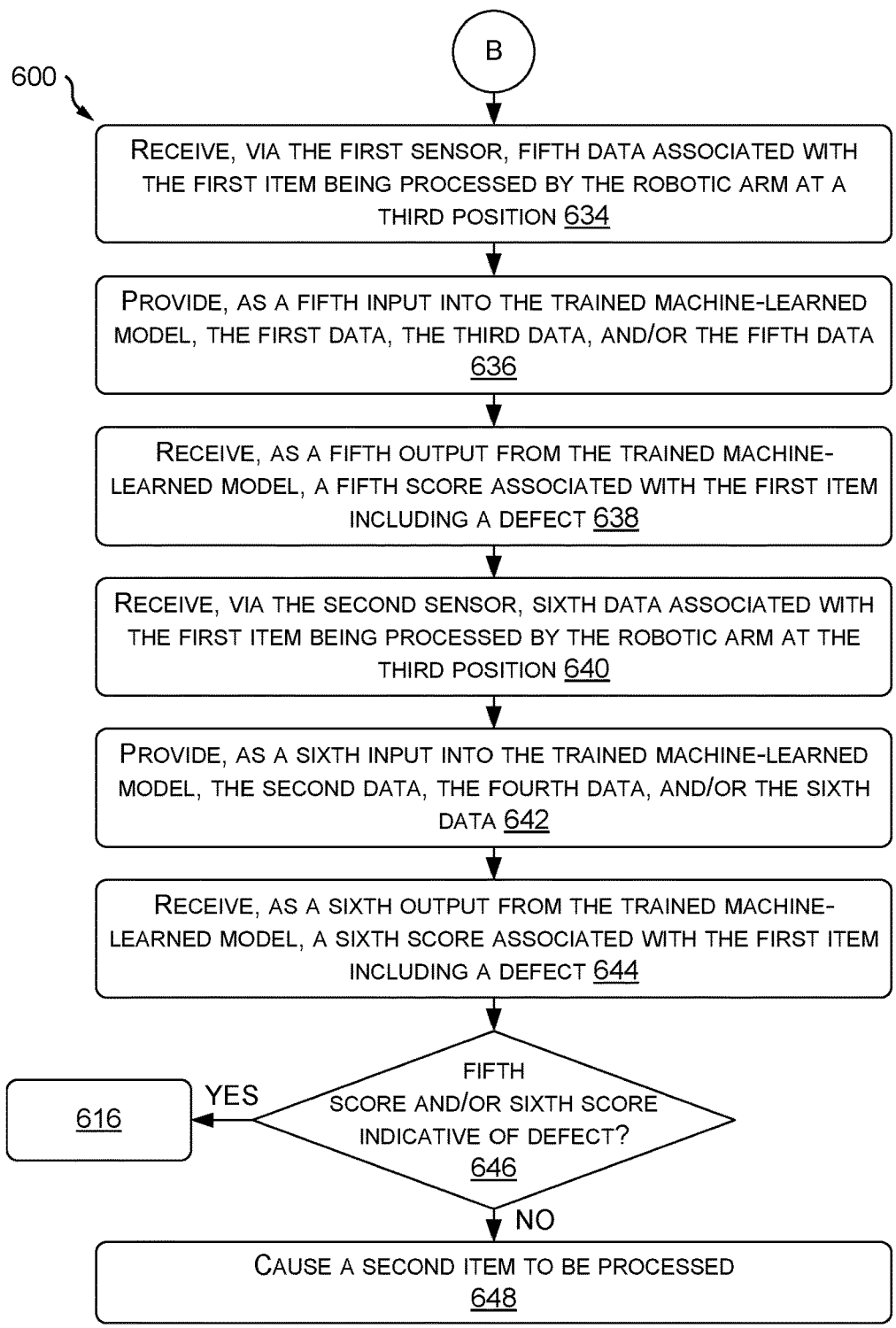
FIG. 8 illustrates a continuation of the process of FIGS. 6 and 7, according to an example of the present disclosure.

FIG. 8 illustrates a continuation of the process 600 from "B" in FIG. 7. At 634, the process 600 may include receiving, via the first sensor, fifth data associated with the first item being processed by the robotic arm at a third position. For example, the first sensor may image a portion of the environment of the first item, the robotic arm 108, the end effector 110, and so forth. In some examples, the fifth data may be received upon the first item being placed onto the conveyor system, or other transfer location. That is, after the robotic arm 108 and the end effector 110 have manipulated the first item to the transfer location. As such, the fifth data may be received subsequent (or after) the third data, while the first item has been manipulated and while the robotic arm is in a different position than depicted in the third data. As such, the fifth data may be received subsequent (or after) the third data.

At 636, the process 600 may include providing, as a fifth input into the trained machine-learned model, the first data, the third data, and the fifth data. For example, the first data, the third data, and the fifth data may be provided as an input to the machine-learned model(s) 122. The machine-learned model(s) 122 are configured to process the first data, the third data, and the fifth data to determine whether any defect(s) are present, or associated with the first item. As part of this, the machine-learned model(s) 122 may determine characteristic(s) of the first item (e.g., size, shape, etc.) for use in determining whether the first item contains defect(s). Additionally, or alternatively, the machine-learned model(s) 122 may determine whether packaging of the first item has become open or torn, whether contents of the first item are falling out from the packaging, whether the first item was dropped, and so forth. As such, the characteristic(s) may be indicative of whether the first item contain(s) any defect(s). By providing the first data, the third data, and the fifth data to the machine-learned model(s) 122, the machine-learned model(s) 122 are able to determine differences between the first item as depicted in the first data, the third data, and the fifth data.

At 638, the process 600 may include receiving, as a fifth output from the trained machine-learned model, a fifth score associated with the first item including a defect. For example, the fifth score may relate to a probability of the first item including a defect, or not including a defect. In the case of the first item including a defect, a "high" score may relate to the probability of the first item including a defect. In the case of the first item not including a defect, a "low" score may relate to the probability of the first item not including a defect. As discussed above, in some examples, the machine-learned model(s) 122 may determine the fifth score based on determining characteristics of the first item via analyzing the third data.

At 640, the process 600 may include receiving, via the second sensor, sixth data associated with the first item being processed by the robotic arm at the third position. For example, the second sensor may image a portion of the environment of the first item, the robotic arm 108, the end effector 110, and so forth. In some examples, the sixth data may be received upon the first item being placed onto the conveyor system, or other transfer location. As such, the sixth data may be received subsequent (or after) the fourth data. As such, the sixth data may be received subsequent (or after) the fourth data, while the first item has been manipulated and while the robotic arm is in a different position than depicted in the fourth data. In some examples, the sixth data may be captured at the same time, or at substantially the same time, as the fifth data.

At 642, the process 600 may include providing, as a sixth input into the trained machine-learned model, the second data, the fourth data, and/or the sixth data. For example, the second data, the fourth data, and/or the sixth data may be provided as an input to the machine-learned model(s) 122. The machine-learned model(s) 122 are configured to process the second data, the fourth data, and/or the sixth data to determine whether any defect(s) are present, or are associated with the first item. As part of this, the machine-learned model(s) 122 may determine characteristic(s) of the first item (e.g., size, shape, etc.) for use in determining whether the first item contains defect(s). Additionally, or alternatively, the machine-learned model(s) 122 may determine whether packaging of the first item has become open or torn, whether contents of the first item are falling out from the packaging, whether the first item was dropped, and so forth. As such, the characteristic(s) may be indicative of whether the first item contain(s) any defect(s). By providing the second data, the fourth data, and/or the sixth data to the machine-learned model(s) 122, the machine-learned model(s) 122 are able to determine differences between the first item as depicted in the second data, the fourth data, and/or the sixth data.

At 644, the process 600 may include receiving, as a sixth output from the trained machine-learned model, a sixth score associated with the first item including a defect. For example, the sixth score may relate to a probability of the first item including a defect, or not including a defect. The sixth score may be based on determining characteristics of the first item via analyzing the sixth data. For example, the machine-learned model(s) 122 may learn to associate certain characteristics of the first item to determine whether the first item contains a defect. Based on the characteristic(s), the machine-learned model(s) 122 may learn to predict which items likely have defect(s), and which item(s) are unlikely to have defect(s) by attributing corresponding scores to the individual item(s). In some examples, steps 634-638 may be performed in parallel with steps 640-644.

At 646, the process 600 may include determining whether the fifth score and/or the sixth score is greater than a threshold. For example, the threshold may be associated with a likelihood of the first item containing a defect. The fifth score and/or the sixth score may be compared to the threshold, and if the fifth score and/or the sixth score are greater than the threshold, or satisfy the threshold, the first item may be determined to have a defect. Comparatively, if the fifth score and/or the sixth score are less than the threshold, or do not satisfy the threshold, the first item may not include a defect.

If at 646 the process 600 determines that the fifth score and/or the sixth score are greater than the threshold, the process 600 may follow the "YES" route and proceed to 616 (FIG. 6). Alternatively, if at 646 the process 600 determines that the fifth score and/or the sixth score do not satisfy the threshold, and that the first item is unlikely to contain a defect, the process 600 may follow the "NO" route and proceed to 648.

At 648, the process 600 may include causing a second item to be processed. For example, after successfully manipulating the first item, and upon determining that the first item was manipulated with no defect(s), a second item may be processed and the robotic arm 108 may be instructed to pick the second item from the container. Here, the container may include a plurality of items, and the robotic arm 108 (via the end effector 110) may be configured to identify the second item within the container. In some examples, the second item may be selected at random, or the second item may be selected based on certain criteria (e.g., size, weight, shape, top-most item in the container, closest item to the robotic arm 108, and so forth).

The process 600 therefore illustrates a scenario by which data is continuously generated by the sensor(s) 116 throughout manipulation of item(s) and provided as an input into the machine-learned model(s) 122. In this sense, the machine-learned model(s) 122 continuously process the sensor data 118 to determine the presence of defect(s) during manipulation of the item. Such continuous determination attempts to determine the defect(s) and resolve the defect(s) in a time-efficient manner. Of course, when no defect(s) are detected, the robotic arm 108 may continue to manipulate items from the container without interruption. Additionally, although the process 600 describes using two sensor(s), any number of sensor(s), such as two, three, four, etc. may be used, and the sensor(s) may include different types of sensor(s) compared to one another.

Figure 9:
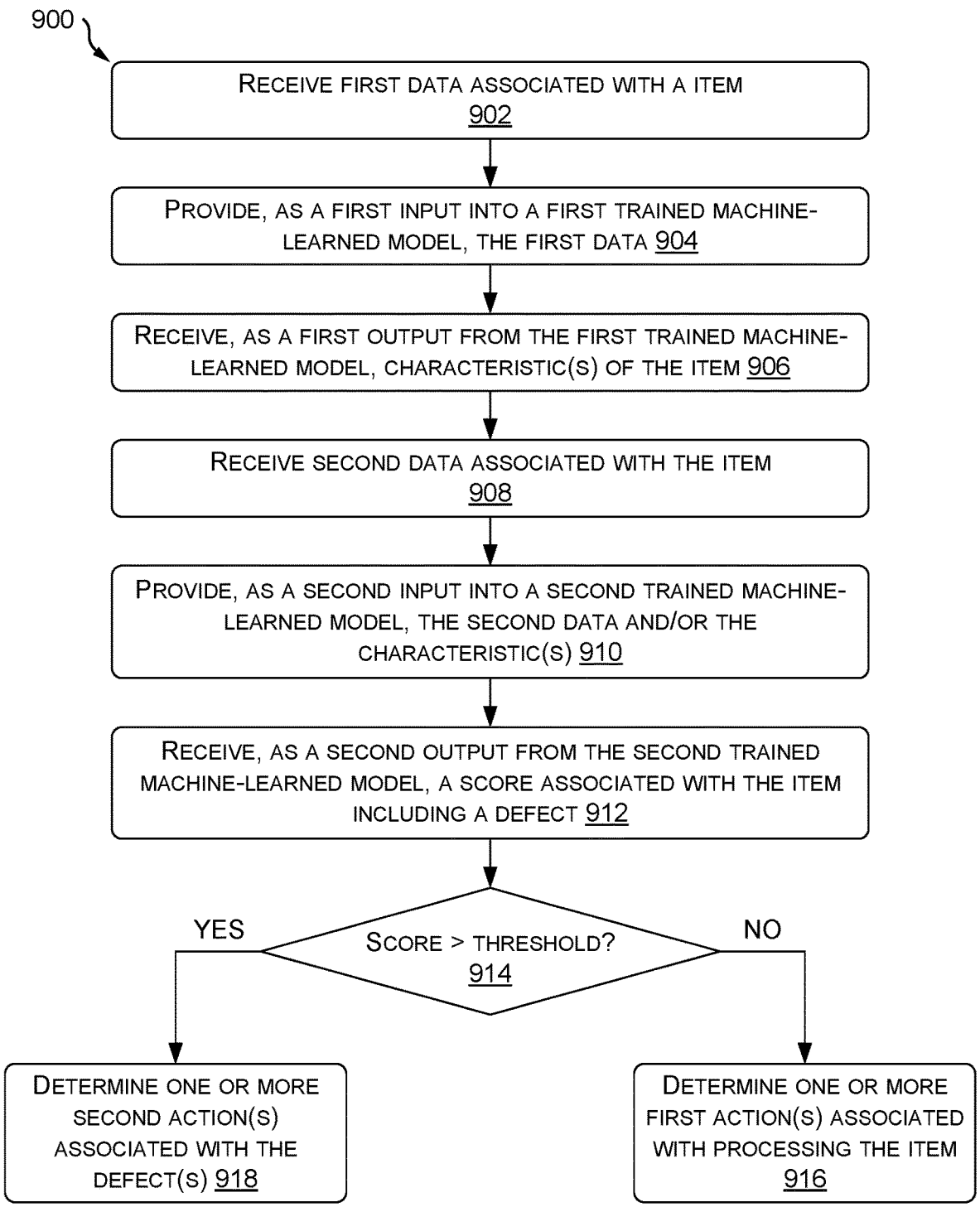
FIG. 9 illustrates an example process for detecting defects, according to an example of the present disclosure.

FIG. 9 illustrates an example process 900 for using multiple machine-learned model(s) to determine whether an item being processed contains any defect(s).

At 902, the process 900 may include receiving first data associated with an item. For example, one or more sensor(s) 116 may generate sensor data 118 of the item being manipulated. In some examples, the first data may be associated with a first manipulation of the item, such as a first position of the robotic arm 108 during manipulation. In other examples, the first data may be received while the item resides which the container, and has yet to be manipulated by the robotic arm 108.

At 904, the process 900 may include providing, as a first input to a first trained machine-learned model, the first data. In some examples, the first trained machine-learned model(s) may analyze the sensor data 118 to determine characteristic(s) of the item. As 906, the process 900 may include receiving, as a first output from the first trained machine-learned model, the characteristic(s) of the item. In some examples, the characteristic(s) may include a size of the item (e.g., dimensions), a shape of the item, a weight of the item, and so forth.

At 908, the process may include receiving second data associated with the item being processed. For example, the one or more sensor(s) 116 may generate sensor data 118 of the item being manipulated. In some examples, the second data may be associated with a manipulation of the item, such as a position of the robotic arm 108 during manipulation.

At 910, the process 900 may include providing, as a second input into a second trained machine-learned model, the second data and/or the characteristic(s). For example, the second machine-learned model may be configured to determine defect(s) of the item, and as part of determining the defect(s), the second machine-learned model may use the characteristic(s) as determined from the first machine-learned model(s). In such examples, the second machine-learned model may compare the characteristic(s), as determined from the first data, with those determined from the second data. Here, if the second machine-learned model determines that characteristic(s) change during manipulation of the item, or if the characteristic(s) are different, defects may be determined. However, the characteristic(s) as determined from the first data provide an indication of what the second machine-learned model should expect, or predict, within the second data.

At 912, the process 900 may include receiving, as an output from the second trained machine-learned model, a score associated with the item including a defect. For example, the score may relate to a probability of the item including a defect, or not including a defect. In the case of the item including a defect, a "high" score may relate to the probability of the item including a defect. In some examples, the second machine-learned model may determine the score based on the characteristic(s) of the item and the second data to determine whether the characteristic(s) are similar to different to that detected using the second data, which may indicate a change during manipulation of the item.

At 914, the process 900 may include determining whether the score is greater than a threshold. For example, the threshold may be associated with a likelihood of the item containing a defect. If at 914 the process 900 determines that the score is not greater than the threshold, the process 900 may follow the "NO" route and proceed to 916.

At 916, the process 900 may include causing one or more first action(s) to be performed. The one or more first action(s), for example, may include causing the robotic arm 108 to manipulate the item to a transfer location. As such, when no defect(s) are detected, the item may continue to be manipulated.

Alternatively, if at 914 the process 900 determines that the score is greater than the threshold, and that the item is likely to contain a defect, the process 600 may follow the "YES" route and proceed to 918. At 918, the process 900 may include causing one or more second action(s) to be performed. For example, if during picking an item the packaging of the item becomes torn and/or contents of the item are falling out of the packaging, the item may be released back into the container. This may avoid having contents of the item(s) scattered across the environment, or between multiple locations. Instead, the contents may be consolidated within the container (or at a single location). Additionally, the container may be flagged for human manipulation (e.g., sortation). If the defect includes a failure to pick the item, the robotic arm may reattempt to pick the item (or another item) from the container. If multiple items were picked, the robotic arm may release the items back into the container and reattempt to pick a single item. In some examples, the action(s) 124 that are determined may be based at least in part on the type of detected defect.

Figure 10:
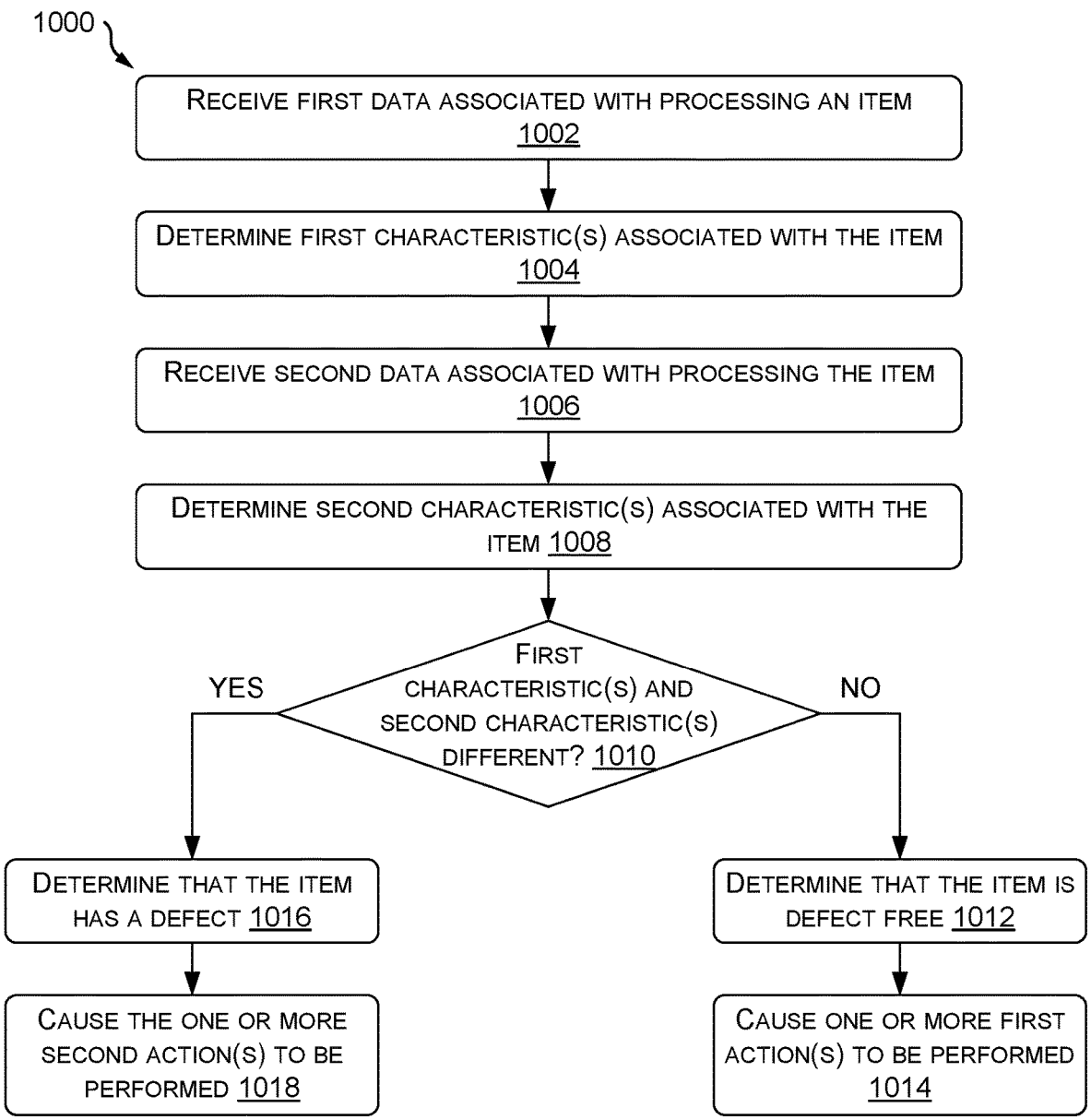
FIG. 10 illustrates an example process for detecting defects, according to an example of the present disclosure.

FIG. 10 illustrates an example process 1000 associated with determining defects of an item based on a change in characteristic(s) associated with the item as the item is being manipulated.

At 1002, the process 1000 may include receiving first data associated with an item being processed. For example, one or more sensor(s) 116 may generate sensor data 118 of the item being manipulated. At 1004, the process 1000 may include determining first characteristic(s) associated with the item. For example, the first characteristic(s) may be determined based on providing the sensor data 118 as an input into the machine-learned model(s) 122. The machine-learned model(s) 122 may analyze the sensor data 118 to determine the first characteristics. In some examples, the first characteristics may include a size of the item (e.g., dimensions), a shape of the item, a weight of the item, and so forth.

At 1006, the process 1000 may include receiving second data associated with the item being processed. For example, the one or more sensor(s) 116 may generate sensor data 118 of the item being manipulated. The second data may be generated subsequent to the first data, by the same, or difference sensor(s) 116. For example, the first data may be associated with a first manipulation of the item, such as a first position of the robotic arm 108 during manipulation, while the second data may be associated with a second manipulation of the item, such as a second position of the robotic arm 108 during manipulation.

At 1008, the process 1000 may include determining second characteristic(s) associated with the item. For example, the second characteristic(s) may be determined based on providing the sensor data as an input into the machine-learned model(s) 122. The machine-learned model(s) 122 may analyze the sensor data 118 to determine the second characteristics. In some examples, the second characteristics may include a size of the item (e.g., dimensions), a shape of the item, a weight of the item, and so forth.

At 1010, the process 1000 may include determining whether the first characteristic(s) and the second characteristics are different. For example, the machine-learned model(s) 122, after determining the first characteristic(s) and the second characteristic(s), may compare the first characteristic(s) and the second characteristic(s) to determine differences therebetween. In some examples, this may include comparing any number of the first characteristics to any number, or a like number, of the second characteristics. One first characteristic may be compared to second characteristics, two first characteristics may be compared to two second characteristics, and so forth.

As an example, the first characteristic may include a size of the item and the second characteristic may include a size of the item. The first characteristic and the second characteristic, in this manner, may be comparable to determine any discrepancies therebetween, and whether the characteristics of the item have changed between the first data and the second data. Such changes may be indicative of defect(s) of the item. For example, if the size of the item has changed, packaging of the item may be unwrapped and/or content of the item(s) may have fallen out. As an additional example, if an object is detected in the second data which was not detected in the first data, the object may be associated with content falling out of the item. Still, as another example, if a shape of the object has changed, the packaging may be torn, unwrapped, open, and so forth.

In some examples, whether the first characteristic and the second characteristic are different may be based on the first characteristic and the second characteristic being different by a threshold amount. If at 1010 the process 1000 determines that the first characteristic and the second characteristic are not different (i.e., the same), the process 1000 may follow the "NO" route and proceed to 1012.

At 1012, the process 1000 may include determining that the item is defect free. Such determination is made to further manipulate the item. For example, at 1014, the process 1000 may include causing one or more first action(s) to be performed. The one or more first action(s), for example, may include causing the robotic arm 108 to manipulate the item to a transfer location. As such, when no defect(s) are detected, the item may continue to be manipulated.

Alternatively, if at 1010 the process 1000 determines that the first characteristic(s) and the second characteristic(s) are different, the process 1000 may follow the "YES" route and proceed to 1016. At 1016, the process 1000 may include determining that the item has a defect. At 1018, the process 1000 may include causing one or more section action(s) to be performed. For example, if during picking an item the packaging of the item becomes torn and/or contents of the item are falling out of the packaging, the item may be released back into the container. This may avoid having contents of the item(s) scattered across the environment, or between multiple locations. Instead, the contents may be consolidated within the container (or at a single location). Additionally, the container may be flagged for human manipulation (e.g., sortation). If the defect includes a failure to pick the item, the robotic arm may reattempt to pick the item (or another item) from the container. If multiple items were picked, the robotic arm may release the items back into the container and reattempt to pick a single item. In some examples, the action(s) 124 that are determined may be based at least in part on the type of detected defect.

The process 1000 therefore illustrates a scenario by which characteristic(s) of the item may be used to determine changes during manipulation. Here, while the robotic arm is moving the item to the conveyor system, second data collected at a second instance in time may include a second size, second shape, etc. In some examples, if the first size and the second size are different, and/or the first shape and the second shape are different, this may be indicative of a defect. For example, a size of the item may become larger in response to the packaging opening. In such instances, the machine-learned model(s) may determine the presence of defect(s) by identifying patterns within the sensor data collected overtime.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   a robotic arm including an end effector configured to move items within an environment between a first location and a second location;
   a first imaging device for imaging the items being moved, the first imaging device having a first field of view in which the robotic arm resides;
   a second imaging device for imaging the items being moved, the second imaging device having a second field of view in which the robotic arm resides, the second field of view being different than the first field of view;
   one or more processors; and
   one or more computer-readable media storing instructions that, when executed, cause the one or more processors to perform operations comprising:
   receiving, from the first imaging device, first image data representing an item among the items being moved between the first location and the second location,
   receiving, from the second imaging device, second image data representing the item being moved between the first location and the second location,
   providing the first image data as a first input to a trained machine-learning model,
   providing the second image data as a second input to the trained machine-learning model,
   generating, based on the first input and as a first output from the trained machine-learning model, a first score associated with the item, the first score representing a first probability that the item includes a defect,
   generating, based on the second input and as a second output from the trained machine-learning model, a second score associated with the item, the second score representing a second probability that the item includes the defect,
   determining, based on at least one of the first image data or the second image data, an identifier of the item,
   determining, based on the identifier, a threshold associated with the item containing the defect,
   determining that at least one of the first score or the second score is equal to or greater than the threshold,
   determining, based on the at least one of the first score or the second score being equal to or greater than the threshold, that the item includes the defect, and
   causing one or more actions to be performed based on the defect.

2. The system of claim 1, wherein:
   the defect is associated with at least one of:
   a packaging of the item being opened,
   one or more contents of the item falling out of the packaging,
   the item being damaged by the end effector,
   the item being dropped from the robotic arm, or
   multiple items being moved by the robotic arm simultaneously; and
   the one or more actions include at least one of:
   causing the robotic arm to transfer the item to the first location,
   causing the robotic arm to transfer the item to the second location, or
   causing one or more personnel to manually sort the item.

3. The system of claim 1, wherein:
   generating the first score is based on at least one of:
   comparing a first size of the item with a reference size indicative of other items that include the defect,
   comparing a first shape of the item with a reference shape indicative of the other items that include the defect;
   comparing a first appearance of the item with a first reference image that includes the defect; or
   comparing the first appearance of the item with a second reference image that does not include the defect; and
   generating the second score is based at least in part on at least one of:
   comparing a second size of the item with the reference size indicative of the other items that include the defect,
   comparing a second shape of the item with the reference shape indicative of the other items that include the defect;
   comparing a second appearance of the item with the first reference image that includes the defect; or
   comparing the second appearance of the item with the second reference image that does not include the defect.

4. A method comprising:
   receiving, via a first imaging device, first image data representing an item being manipulated by a robotic arm;
   receiving, via a second imaging device, second image data representing the item being manipulated by the robotic arm;
   determining an identifier associated with the item;
   determining, based at least in part on the identifier, one or more characteristics of the item;
   determining, using a machine-learning model to analyze the first image data, a first score that indicates whether the item includes a defect;
   determining, using the machine-learning model to analyze the second image data, a second score that indicates whether the item includes the defect;
   determining whether the item includes the defect based at least in part on the one or more characteristics and at least one of the first score or the second score; and
   causing, based at least in part on the at least one of the first score or the second score, the robotic arm to perform an action.

5. The method of claim 4, wherein:
   the robotic arm is configured to process the item between a first location and a second location;
   based at least in part on the item including the defect, the robotic arm is configured to manipulate the item to the first location; and based at least in part on a second determination that the item is defect free, the robotic arm is configured to manipulate the item to the second location.

6. The method of claim 4, wherein:
the first image data is captured at a first instance in time; and
the second image data is captured at a second instance in time that is simultaneous with the first instance in time.

7. The method of claim 4, further comprising:
determining that the item is defect free based at least in part on the at least one of the first score or the second score;
causing, based at least in part on determining that the item is defect free, the robotic arm to further manipulate the item;
receiving, via the first imaging device, third image data representing the item being manipulated by the robotic arm;
receiving, via the second imaging device, fourth image data representing the item being manipulated by the robotic arm;
determining, using the machine-learning model to analyze the first image data and the third image data, a third score that represents whether the item includes the defect;
determining, using the machine-learning model to analyze the second image data and the fourth image data, a fourth score that represents whether the item includes the defect; and
determining whether the item includes the defect based at least in part on at least one of the third score or the fourth score.

8. The method of claim 4, wherein:
the first score is based at least in part on at least one of:
a first shape of the item,
a first size of the item,
multiple items being manipulated by the robotic arm simultaneously, or
a packaging of the item; and
the second score is based at least in part on at least one of:
a second shape of the item,
a second size of the item,
the multiple items being manipulated by the robotic arm simultaneously, or
the packaging of the item.

9. The method of claim 4, further comprising:
at least one of:
comparing the first score to a threshold to determine that the first score satisfies the threshold, or
comparing the second score to the threshold to determine that the second score satisfies the threshold; and
one of:
determining that the item is defect free based at least in part the first score satisfying the threshold and the second score satisfying the threshold, or
determining that the item includes the defect based at least in part on one of the first score not satisfying the threshold or the second score not satisfying the threshold.

10. The method of claim 4, wherein:
the first imaging device has a first field of view of the item being manipulated by the robotic arm; and
the second imaging device has a second field of view of the item being manipulated by the robotic arm, the second field of view being different than the first field of view.

11. The method of claim 4, further comprising:
determining, using the machine-learning model to analyze the first image data, one or more second characteristics of the item; and
determining, using the machine-learning model to analyze the second image data, one or more third characteristics of the item;
wherein:
determining the first score is based at least in part on comparing the one or more characteristics with the one or more second characteristics, and
determining the second score is based at least in part on comparing the one or more characteristics with the one or more third characteristics.

12. A system comprising:
one or more processors; and
one or more computer-readable media storing instructions that, when executed, cause the one or more processors to perform operations comprising:
receiving first image data representing an item being processed by a robotic arm;
receiving second image data representing the item being processed by the robotic arm;
determining, based at least in part on a machine-learning model analyzing the first image data, one or more first characteristics of the item;
determining, based at least in part on the machine-learning model analyzing the second image data, one or more second characteristics of the item;
generating, based on the first input and as a first output from the machine-learning model, a first score associated with the item, the first score representing a first probability that the item includes a defect,
generating, based on the second input and as a second output from the machine-learning model, a second score associated with the item, the second score representing a second probability that the item includes the defect,
determining, based on at least one of the first image data or the second image data, an identifier of the item,
determining, based on the identifier, a threshold associated with the item containing the defect,
determining that at least one of the first score or the second score is equal to or greater than the threshold,
determining, based on the at least one of the first score or the second score being equal to or greater than the threshold, that the item includes the defect, and
causing one or more actions to be performed based on the defect.

13. The system of claim 12, the operations further comprising causing, based at least in part on determining that the item is free of includes the defect, causing the robotic arm to manipulate the item.

14. The system of claim 13, wherein the robotic arm is configured to process the item between a first location and a second location, and causing the robotic arm to manipulate the item comprises causing the robotic arm to manipulate the item towards the second location, the operations further comprising:
receiving third image data representing the item being processed by the robotic arm;
receiving fourth image data representing the item being processed by the robotic arm;
determining, based at least in part on the machine-learning model analyzing the third image data, one or more third characteristics of the item;

determining, based at least in part on the machine-learning model analyzing the fourth image data, one or more fourth characteristics of the item;

determining, based at least in part on at least one of the one or more third characteristics or the one or more fourth characteristics, that the item includes the defect; and causing the robotic arm to manipulate the item towards the first location.

15. The system of claim 14, determining that the item includes the defect is based at least in part on one of:

comparing the one or more first characteristics and the one or more third characteristics to identify a first difference; or comparing the one or more second characteristics and the one or more fourth characteristics to identify a second difference.

16. The system of claim 12, the operations further comprising determining one or more actions to be performed based at least in part on the item including the defect, the one or more actions including at least one of:

instructing one or more personnel to manually sort the item;

causing the robotic arm to manipulate the item to a sorting location; or causing the robotic arm to release the item.

17. The system of claim 12, the operations further comprising:

determining, based at least in part on the one or more first characteristics, a first score associated with the item being defect free;

determining that the first score is equal to or greater than a threshold;

determining, based at least in part on the one or more second characteristics, a second score associated with the item being defect free; and determining that the second score is equal to or greater than the threshold, wherein determining that the item is defect free is based at least in part on the first score being equal to or greater than the threshold or the second score being equal to or greater than the threshold.

18. The system of claim 12, wherein:

the machine-learning model is configured to generate a first output indicating whether the one or more first characteristics are representative of the item containing the defect; and the machine-learning model is configured to generate a second output indicating whether the one or more second characteristics are representative of the item containing the defect.

19. The system of claim 12, wherein the machine-learning model is configured to identify at least one of:

a packaging of the item being opened;

one or more contents of the item falling out of the packaging;

the item being damaged;

the item being dropped from the robotic arm; or multiple items being processed by the robotic arm simultaneously.

20. The system of claim 12, wherein:

the first image data is generated by a first imaging device that has a first field of view of the item being processed by the robotic arm; and the second image data is generated by a second imaging device that has a second field of view of the item being processed by the robotic arm, the second field of view being different than the first field of view.

* * * * *